(12) United States Patent
Luo et al.

(10) Patent No.: US 11,502,761 B2
(45) Date of Patent: Nov. 15, 2022

(54) ENHANCED RRM/CSI MEASUREMENT FOR INTERFERENCE MANAGEMENT

(71) Applicant: QUALCOMM Incorporated, San Diego, CA (US)

(72) Inventors: Jianghong Luo, Skillman, NJ (US); Navid Abedini, Somerset, NJ (US); Junyi Li, Chester, NJ (US); Muhammad Nazmul Islam, Littleton, MA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 16/379,227

(22) Filed: Apr. 9, 2019

(65) Prior Publication Data

US 2019/0363810 A1    Nov. 28, 2019

Related U.S. Application Data

(60) Provisional application No. 62/676,855, filed on May 25, 2018.

(51) Int. Cl.
*H04L 1/00* (2006.01)
*H04B 1/10* (2006.01)
(Continued)

(52) U.S. Cl.
CPC ......... *H04B 17/345* (2015.01); *H04B 1/1027* (2013.01); *H04B 17/336* (2015.01);
(Continued)

(58) Field of Classification Search
CPC .. H04B 1/1027; H04B 17/336; H04B 17/345; H04B 17/3913; H94L 5/0073
See application file for complete search history.

(56) References Cited

U.S. PATENT DOCUMENTS

| 2011/0228883 A1 | 9/2011 | Liu et al. |
|---|---|---|
| 2012/0208547 A1 | 8/2012 | Geirhofer et al. |

(Continued)

FOREIGN PATENT DOCUMENTS

| EP | 3190820 A1 | 7/2017 |
|---|---|---|
| EP | 3252971 A1 | 12/2017 |

(Continued)

OTHER PUBLICATIONS

Ericsson: "Enabling Beam Grouping by UE in Mobility RS Measurements", 3GPP Draft; R1-1611916_MRS_Including_CELLID, 3rd Generation Partnership Project (3GPP), Mobile Competence Centre, 650, Route Des Lucioles, F-06921 Sophia-Antipolis Cedex, France, vol. RAN WG1, No. Reno, NV, USA; Nov. 14, 2016-Nov. 18, 2016 Nov. 5, 2016, XP051190252, Retrieved from the Internet: URL:http://www.3gpp.org/ftp/tsg_ran/WG1_RL1/TSGR1_87/Docs/ [retrieved on Nov. 5, 2016], 8 pages.

(Continued)

*Primary Examiner* — Brian P Cox
(74) *Attorney, Agent, or Firm* — ArentFox Schiff LLP

(57) ABSTRACT

A method, apparatus, and computer-readable medium are provided that performs an interference measurement with an enhanced accuracy. The apparatus detects a signal from a serving cell, a neighbor cell, or a second apparatus in the neighbor cell. The apparatus estimates at least one of a downlink-downlink interference and a cross-uplink-downlink interference of the neighbor cell or the second apparatus in the neighbor cell. In another aspect of the disclosure, a method, a computer-readable medium, and an apparatus are provided that configures a User Equipment (UE) to perform the interference measurement and receives an interference measurement report from the UE. The apparatus estimates at least one of an uplink-uplink interference and a cross-
(Continued)

$h_{21}$: DL-to-DL interference
$h'_{21}$: RRM neighbor cell measurement downlink-uplink interference of the neighbor cell or the second apparatus in the neighbor cell.

54 Claims, 18 Drawing Sheets

(51) Int. Cl.
    *H04B 17/345*     (2015.01)
    *H04B 17/391*     (2015.01)
    *H04L 5/00*     (2006.01)
    *H04B 17/336*     (2015.01)

(52) U.S. Cl.
    CPC ....... *H04B 17/3913* (2015.01); *H04L 5/0073* (2013.01); *H04B 2001/1045* (2013.01)

(56) References Cited

U.S. PATENT DOCUMENTS

| | | |
|---|---|---|
| 2013/0083729 A1 | 4/2013 | Xu et al. |
| 2014/0098695 A1* | 4/2014 | Jeong .................. H04B 7/0619 370/252 |
| 2014/0177486 A1 | 6/2014 | Wang et al. |
| 2015/0103706 A1* | 4/2015 | Li ......................... H04W 16/10 370/280 |
| 2015/0237518 A1* | 8/2015 | Seo ....................... H04L 5/0007 455/452.1 |
| 2017/0164230 A1* | 6/2017 | You ...................... H04B 17/336 |
| 2017/0171758 A1* | 6/2017 | Li ......................... H04W 24/10 |
| 2018/0091212 A1 | 3/2018 | Lee et al. |
| 2018/0219606 A1* | 8/2018 | Ng ........................ H04L 5/0053 |
| 2020/0059285 A1* | 2/2020 | Zhang ................. H04W 72/046 |
| 2020/0067614 A1* | 2/2020 | Wang ................... H04J 11/0023 |

FOREIGN PATENT DOCUMENTS

| | | |
|---|---|---|
| WO | 2014038755 A1 | 3/2014 |
| WO | 2014166061 A1 | 10/2014 |
| WO | 2018062833 A1 | 4/2018 |
| WO | 2018087735 A1 | 5/2018 |

OTHER PUBLICATIONS

Partial International Search Report—PCT/US2019/026796—ISA/EPO—dated Jun. 27, 2019.
International Search Report and Written Opinion—PCT/US2019/026796—ISA/EPO—dated Aug. 29, 2019.
Taiwan Search Report—TW108112474—TIPO—dated May 4, 2022.

* cited by examiner $h_{12}$: UL-to-UL interference $h_{21}$: DL-to-DL interference
$h'_{21}$: RRM neighbor cell measurement

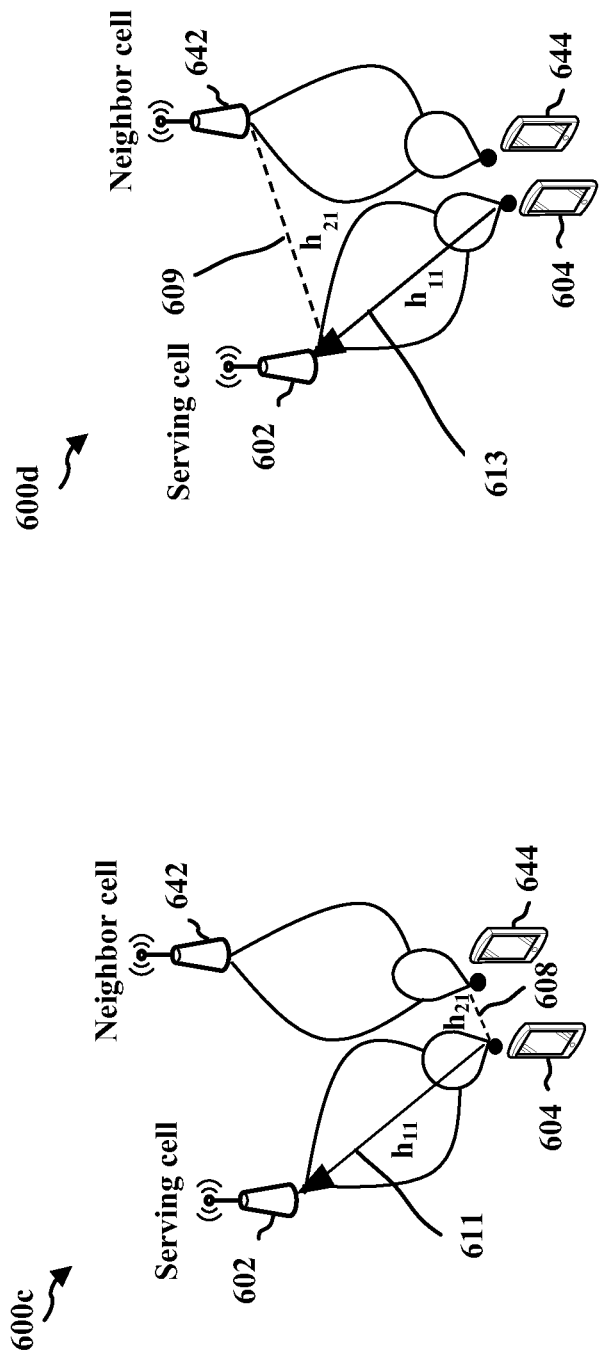

ENHANCED RRM/CSI MEASUREMENT FOR INTERFERENCE MANAGEMENT

CROSS-REFERENCE TO RELATED APPLICATION(S)

This application claims the priority of U.S. Provisional Application Ser. No. 62/676,855, entitled "ENHANCED RRM/CSI MEASUREMENT FOR INTERFERENCE MANAGEMENT" and filed on May 25, 2018, the disclosure of which is expressly incorporated by reference herein in their entirety.

BACKGROUND

Technical Field

The present disclosure relates generally to communication systems, and more particularly, to interference measurement in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in wireless communication including NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Scheduling may be coordinated among multiple cells based on RRM measurement reports of the User Equipment (UE). However, existing RRM measurement reports are designed mainly for handover purpose and are based on downlink reference signals. For example, the measurement of a downlink (DL)-DL interference may be based on a best receiving beam for a neighbor cell to support the handover procedure. However, the actual interference may be based on the receiving beam for a serving cell. Thus, the actual DL-DL interference can be different, e.g., smaller, than the reported RRM measurement. In addition, the data transmissions may use a refined transmission and reception beam pair rather than the reported beams in RRM. Aspects presented herein improve the accuracy of interference measurements, which enables improvements in coordinated scheduling.

In an aspect of the disclosure, a method, a computer-readable medium, and an apparatus are provided. The apparatus performs an interference measurement. The apparatus detects a signal from a serving cell, a neighbor cell, or a second apparatus in the neighbor cell, where the signal from the neighbor cell or the second apparatus interferers with communication between the apparatus and the serving cell. The apparatus estimates at least one of a downlink-downlink interference and a cross-uplink-downlink interference of the neighbor cell or the second apparatus in the neighbor cell. The apparatus further transmits an interference measurement report to the serving cell.

In another aspect of the disclosure, a method, a computer-readable medium, and an apparatus are provided. The apparatus configures a User Equipment (UE) to perform an interference measurement to detect a signal from a serving cell, a neighbor cell, or a second UE in the neighbor cell, the signal from the neighbor cell or the second UE interfering with communication between the UE and the serving cell. The apparatus receives an interference measurement report from the UE, the interference measurement report comprising an indication of at least one of a downlink-downlink interference and a cross-uplink-downlink interference of the neighbor cell or the second UE in the neighbor cell.

In another aspect of the disclosure, a method, a computer-readable medium, and an apparatus are provided for a distributed unit (DU) involved in wireless communication with a UE served by a serving cell. The apparatus measures at least one of a uplink-uplink interference and a cross-downlink-uplink interference at the DU. Then, the apparatus reports the at least one of the uplink-uplink interference and the cross-downlink-uplink interference to a central unit (CU).

In another aspect of the disclosure, a method, a computer-readable medium, and an apparatus are provided for wireless communication for a CU involved in wireless interfacing with multiple DUs. The apparatus configures at least one DU to measure at least one of a uplink-uplink interference and a cross-downlink-uplink interference at the DU. Then, the apparatus receives a report of the at least one of the uplink-uplink interference and the cross-downlink-uplink interference from the at least one DU.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6C is a diagram illustrating an example of a cross-UL-to-DL interference.

FIG. 6D is a diagram illustrating an example of a cross-DL-to-UL interference.

DETAILED DESCRIPTION

Figure 1:
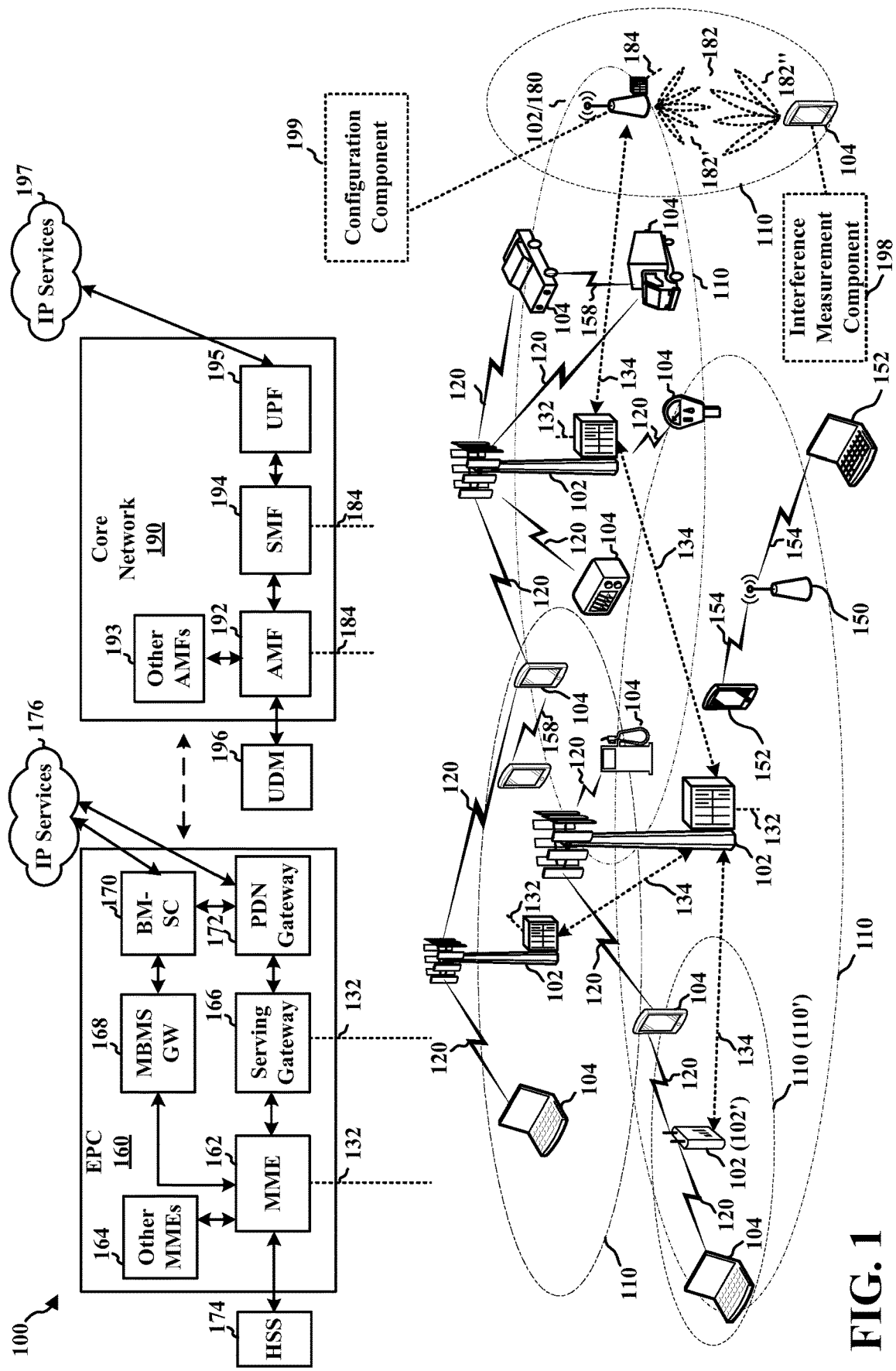
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for nonaccess stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise an interference measurement component 198 that is configured to perform an interference measurement. For example, the UE may be configured to perform an interference measurement by detecting a signal from a serving cell, a neighbor cell, or a second UE in the neighbor cell, where the signal from the neighbor cell or the second UE interferers with communication between the UE and the serving cell. The UE 104 may be configured to estimate at least one of a downlink-downlink interference and a cross-uplink-downlink interference of the neighbor cell or the second UE in the neighbor cell. The UE 104 may further be configured to transmit an interference measurement report to the serving cell. In some aspects, a network, for example, base station 120/180, may comprise a configuration component 199 to configure the UE 104 to perform the interference measurement to detect a signal from a serving cell, a neighbor cell, or a second UE in the neighbor cell, the signal from the neighbor cell or the second UE interfering with communication between the UE and the serving cell. The network receives an interference measurement report from the UE, the interference measurement report comprising an indication of at least one of a downlink-downlink interference and a cross-uplink-downlink interference of the neighbor cell or the second UE in the neighbor cell. Although the following description may be focused on 5G NR, the concepts described herein may also be applicable to other similar areas, such as LTE, LTE-A, CDMA, GSM, and other wireless technologies.

Figure 2:
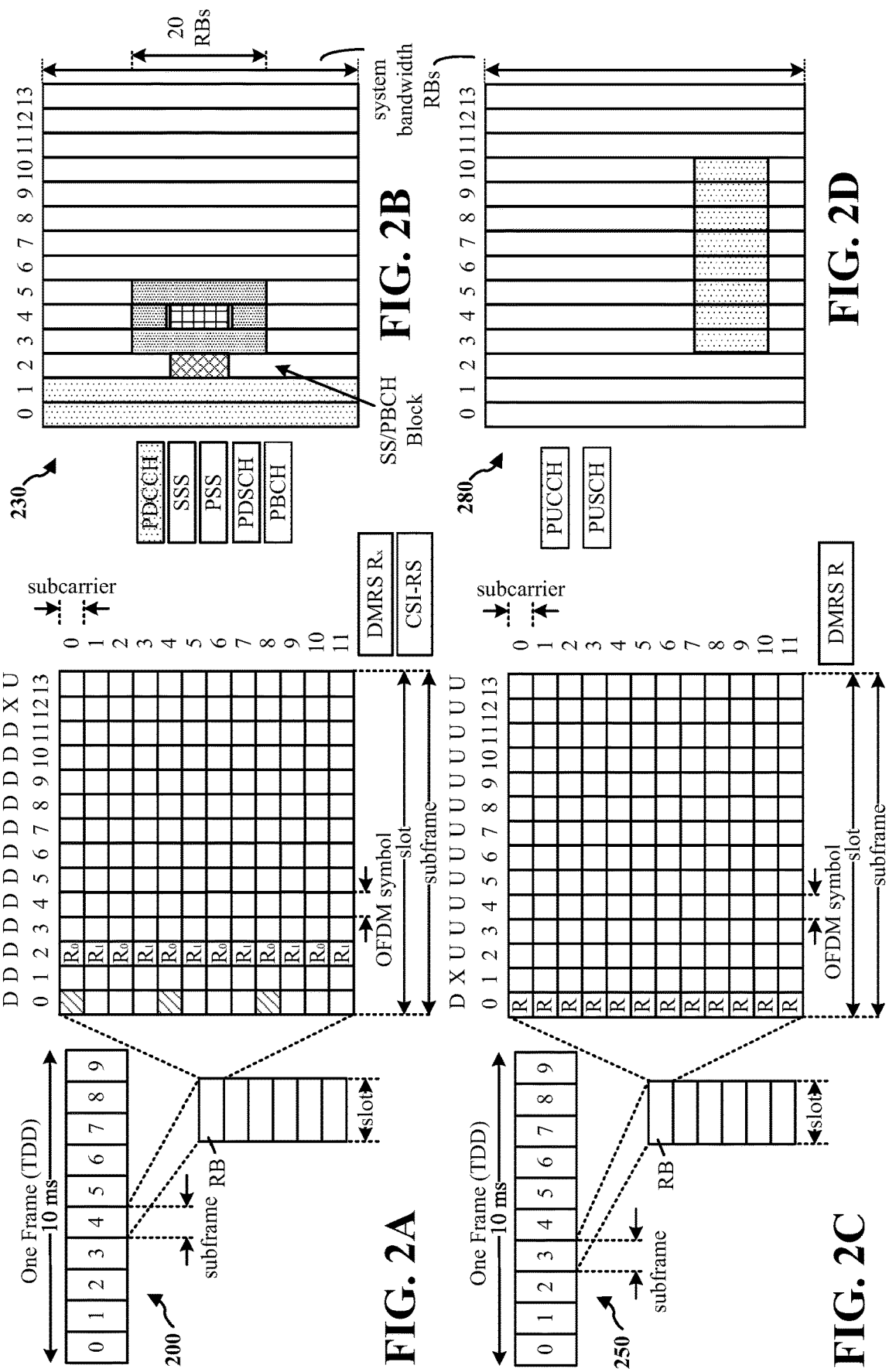
FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
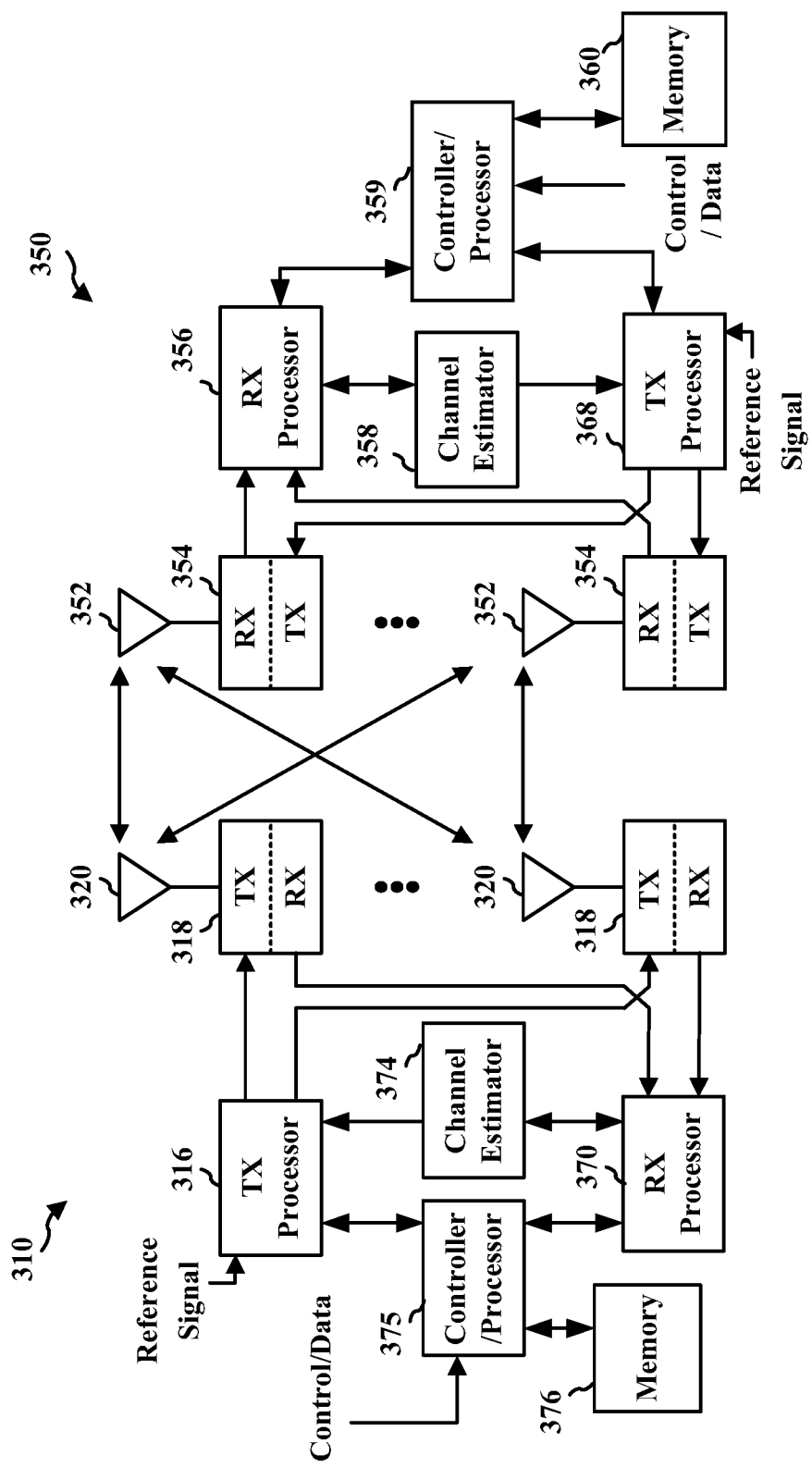
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Figure 4:
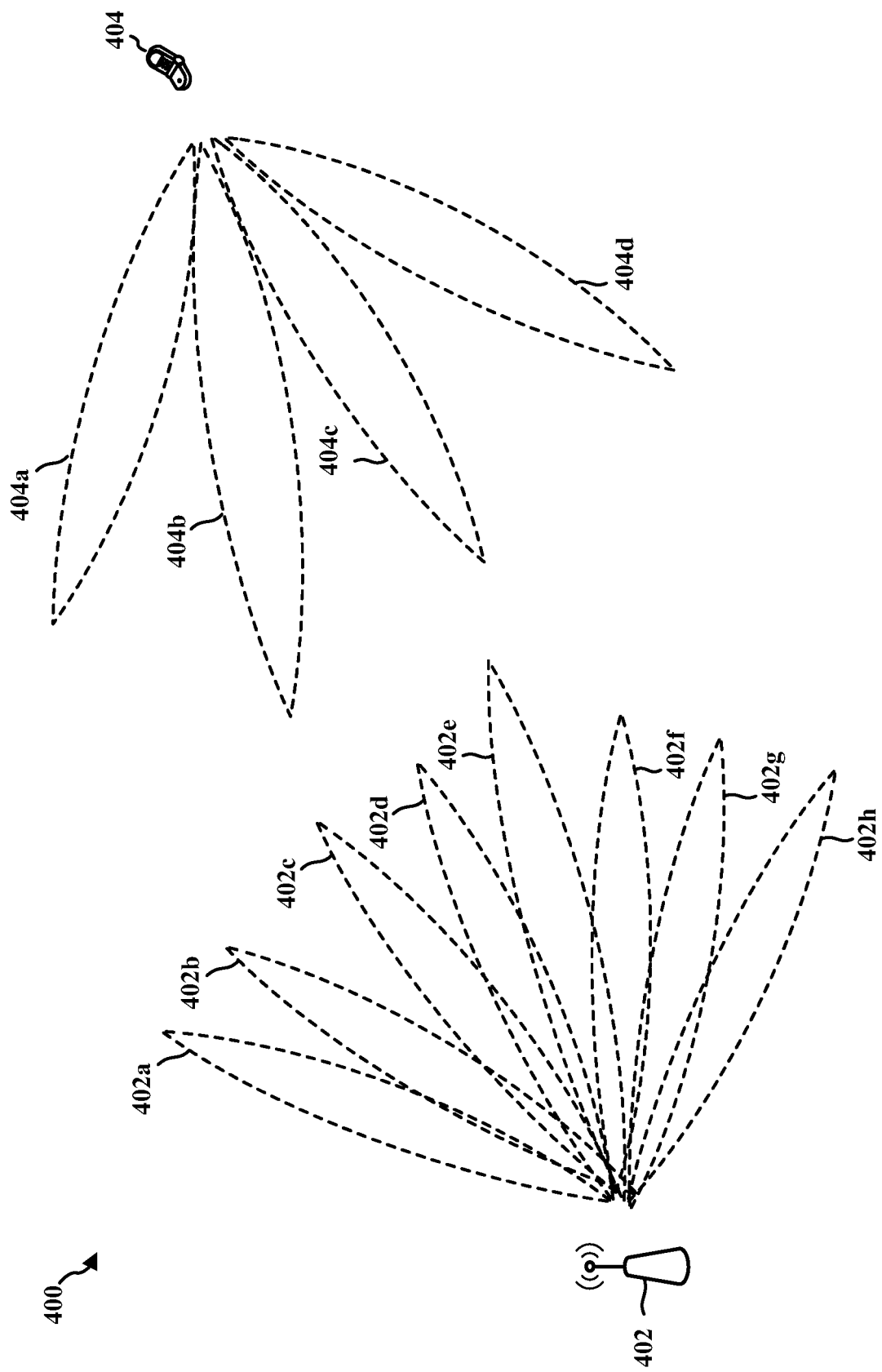
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

An RRM procedure may be performed in order for a UE to report measurements of reference signal beams for a serving cell and/or neighbor cell(s). For example, the UE may be configured to report a reference signal beam index and a corresponding measurement quantity for beam(s) from its serving cell and/or from neighbor cells that the UE can detect. Examples of the measured reference signals can include a synchronization signal block (SSB), a channel state information reference signal (CSI-RS), etc. The measurement quantity can comprise any of a reference signal received power (RSRP), a reference signal received quality (RSRQ), a signal to interference and noise ratio (SINR), etc. As an example, measurement results may indicate any of a physical cell ID, cell global identification information, measurement results, or RS index results. For example, measurement results for SSB and CSI-RS may be included. As an example, RS index results for SSB indexes and CSI-RS indexes may be measured.

Figure 5A:
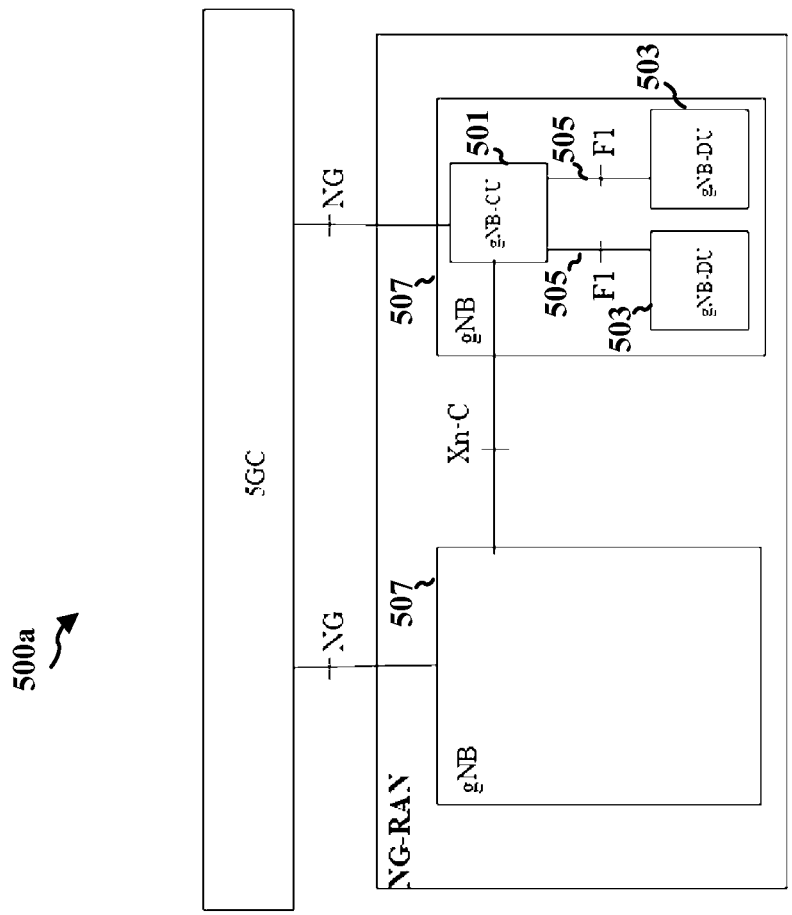
FIG. 5A is a diagram of an example of a network architecture.

FIG. 5A is a diagram of an example of a network architecture 500a including a central unit-distributed unit (CU-DU) split architecture. For example, a base station 507 (e.g., gNB) in can be split into a CU 501, one or more DUs 503, and an F1 interface 505 between the CU and the one or more DUs. The CU 501 hosts RRC, Service Data Adaptation Protocol (SDAP), Packet Data Convergence Protocol (PDCP), etc. A CU-DU network architecture may be employed in a 5G NR network, for example. However, the concepts presented herein may also be employed in other wireless networks.

The one or more DUs 503 host Radio Link Control (RLC), Medium Access Control (MAC), Physical Layer (PHY), etc. The one or more DUs 503 are partly controlled by the CU 501. The F1 interface 505 is based on F1-Application Protocol (F1-AP) that defines signaling messages between the CU and the one or more DUs.

Figure 5B:
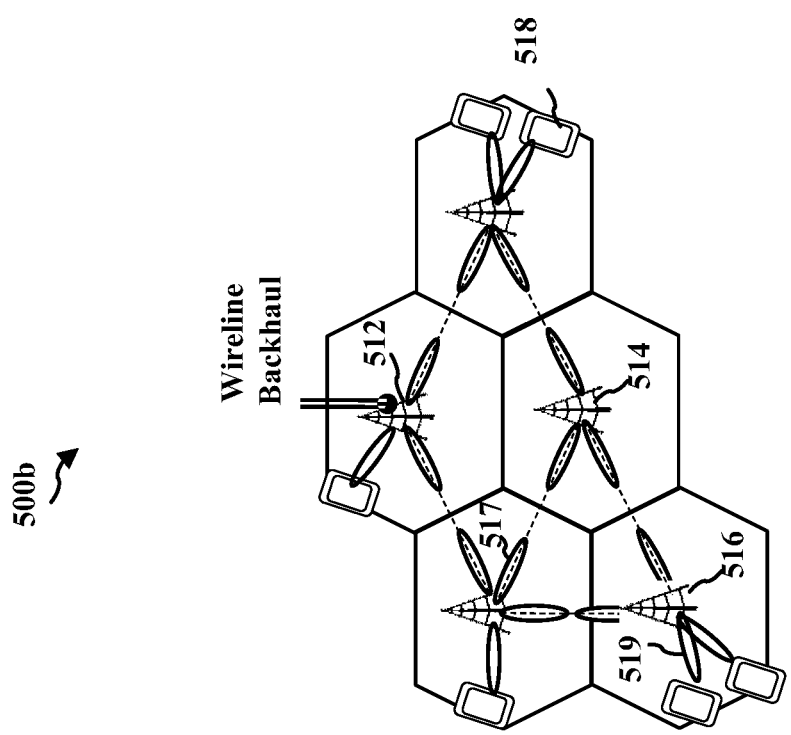
FIG. 5B is a diagram illustrating an example of an Integrated Access and Backhaul (IAB) network.

FIG. 5B is a diagram illustrating an example of an Integrated Access and Backhaul (IAB) network 500b. NR technologies, such as mmW, can be used to support an access network, a backhaul network and/or an Integrated Access/Backhaul (IAB) network. The access network is provided between an access node (AN) and UEs. The backhaul network is a network provided between ANs. An IAB network shares the resources between the access network and the backhaul network. As shown in FIG. 5B, the IAB network can include an IAB-donors, e.g., 512, and one or more IAB-nodes, e.g., 514, 516. The IAB-donor is a RAN node with wireline connection to a core network. The IAB-node is a RAN-node that provides IAB functionality, i.e. access for UEs, e.g., 518, combined with wireless self-backhauling capabilities. The links between the IAB-donors, e.g., 512, and the IAB-nodes, e.g., 514, 516, are backhaul links, e.g., 517. The links between UEs, e.g., 518, and the IAB-donors, e.g., 512, or the IAB-nodes, e.g., 514, 516 are access links, e.g. 519.

Figure 5C:
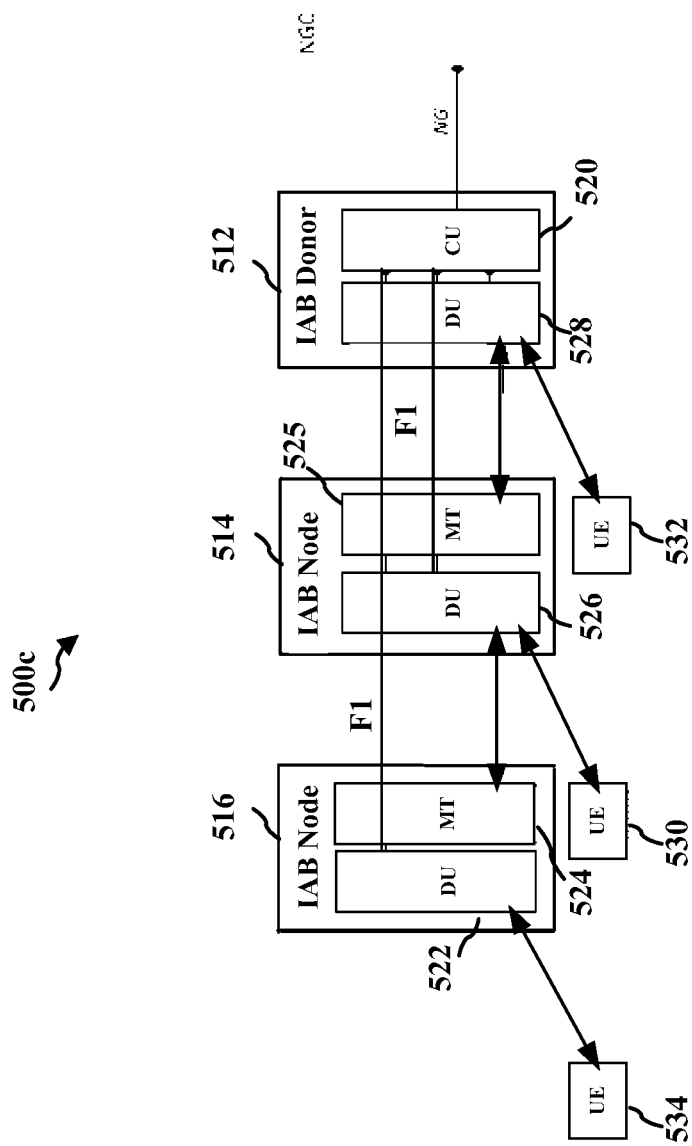
FIG. 5C is a diagram illustrating an example of an Integrated Access and Backhaul (IAB) network architecture group.

FIG. 5C is a diagram illustrating an example of an IAB network architecture group 1 500*c*. In this architecture, the CU 520 is at the IAB-donor 512, and each IAB-node, e.g., 514, 516, has two functions: a Mobile-termination (MT) function, e.g., 524, 525, and a DU function, e.g., 522, 526, 528. The MT function serves as a scheduled node toward its parent scheduling node. The DU function serves as a scheduling node toward its child scheduled nodes.

In this disclosure, a CU can refer to a central entity that controls multiple scheduling nodes in the network, and a DU can refer to a scheduling node in the network. UE can refer to a scheduled node in the network.

When applying the aspects presented herein to an IAB network architecture group 1, CU can refer to the CU functionality at an IAB-donor that controls DUs of all IAB-nodes and its own DU. DU can refer to the DU functionality at an IAB-node or an IAB-donor, which schedules UEs and MTs under its coverage. UE can refer to a UE for the access link or a MT functionality at an IAB-node for backhaul link.

Referring to FIG. 5C, the CU-DU architecture can be used to coordinate scheduling among multiple cells. For example, all cells that participate in coordinated scheduling can form a coordination cluster controlled by one CU 520. The CU 520 can coordinate different DUs, e.g., 522, 526, 528, over all cells to control inter-cell interference.

The CU 520 can create an interference profile among multiple cells within the coordination cluster based on a UE's RRM measurement report(s). The RRM measurement report from the UE, e.g., 530, may be based on reference signals (e.g., beam index) and measurement quantities for serving cell as well as neighbor cells. For example, the interference profile created by the CU 520 may include a list of potential interfering UEs, e.g., 532, 534, among neighbor cells. A second UE, e.g., 532, can be identified as an interfering UE to a UE, e.g., 530, if the second UE's serving beam is one of the first UE's interference beams or their neighbor beams. For another example, the interference profile created by the CU 520 may include a list of potential interfering beams among neighbor cells. The information of potential interfering beams among neighbor cells can be used to coordinate beam sweep pattern for various procedures among neighbor cells such as synchronization, beam management, inter-relay discovery, Random Access Channel (RACH), etc. Identification of interfering beams can be based on history of RRM reports provided by a groups of UEs.

As the interference profile is created based on the UE's RRM measurement report, there are several problems in current RRM measurement, which is designed to perform measurements for handover. Aspects presented herein improve accuracy of the UE's measurements in order to provide more effective interference management. There are several types of interference from neighbor cells, including DL-to-DL interference, UL-to-UL interference, cross-UL-to-DL interference and cross-DL-to-UL interference, as examples. The DL-to-DL interference is an interference from a neighbor cell's DL transmission when a DL transmission to the UE from its serving cell is interfered by the neighbor cell's DL transmission to a second UE of the neighbor cell. The UL-to-UL interference is an interference from the second UE of the neighbor cell when a UL transmission from the UE to its serving cell is interfered by the second UE's UL transmission targeted at the neighbor cell. The cross-UL-to-DL interference is an interference from the second UE of the neighbor cell when a DL transmission to the UE from its serving cell is interfered by the second UE's UL transmission targeted at the neighbor cell. The cross-DL-to-UL interference is an interference from the neighbor cell when a UL transmission from the UE to its serving cell is interfered by the neighbor cell's DL transmission targeted at the second UE. In current RRM measurement, some of the above types of interference are not being measured accurately, such as the DL-to-DL interference. In addition, some of the above types of interference are not being measured, such as the cross-UL-to-DL interference, the cross-DL-to-UL interference.

Figures 6A, 6B:
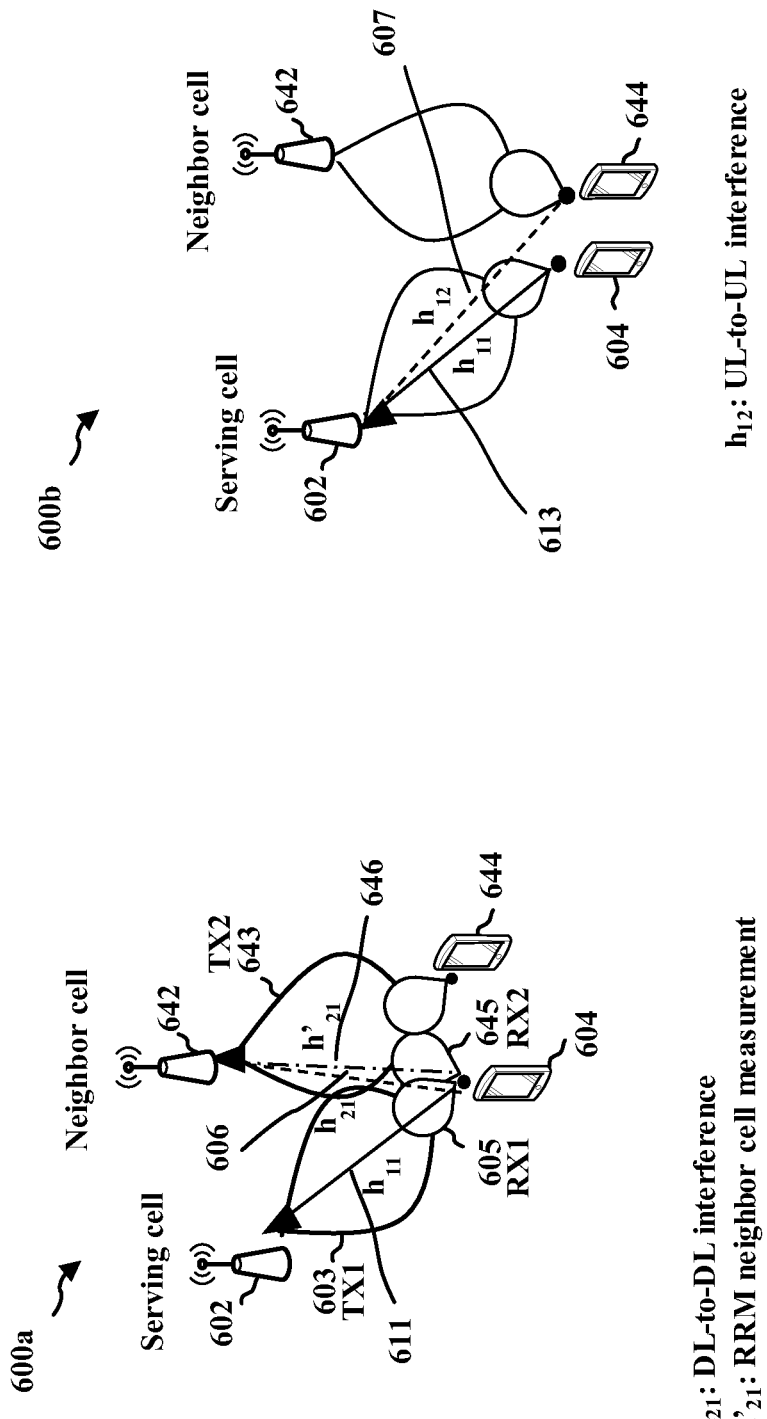
FIG. 6A is a diagram illustrating an example of a DL-DL inter-cell interference.
FIG. 6B is a diagram illustrating an example of a UL-UL inter-cell interference.

FIG. 6A is a diagram 600*a* illustrating an example of a DL-DL inter-cell interference 606. As shown in FIG. 6A, a DL transmission 611, for example, $h_{11}$ as illustrated in FIG. 6A, from a serving cell 602 to a UE 604 may be interfered by another DL transmission from a neighbor cell 642 targeted at a second UE 644. The actual DL-DL inter-cell interference 606, for example, $h_{21}$ as illustrated in FIG. 6A, may be different than a reported RRM neighbor cell measurement 646, for example, $h'_{21}$ as illustrated in FIG. 6A. The neighbor cell measurement 646, $h'_{21}$, is based on a best reception beam 645, for example, RX2 for the UE 604 to receive communication from the neighbor cell 642. This is because the RRM neighbor cell measurement is designed for handover purposes. In contrast to the RRM neighbor cell measurement, the actual interference experienced by the UE 604 will be on the reception beam that the UE 604 uses to receive communication from the serving cell 602, not a reception beam for communicating with the neighbor cell 642. The transmission beam 603 from the serving cell 602 is illustrated as TX1. The interfering transmission beam 643 from the neighbor cell 642 is illustrated as TX2. The actual DL interference $h_{21}$ 606 would be based on the a same reception beam or receiving beam 605, for example, RX1, used for the serving cell 602. Thus, the actual DL interference 606 can be smaller than the reported RRM measurement 646 for the neighbor cell 642, which uses the best reception beam 645 for the UE to receive communication from the neighbor cell, e.g., for handover purposes. Thus, the DL-to-DL inter-cell interference 606 may be overestimated if solely based on existing RRM measurement, which is mainly designed for handover purposes. In addition, the data transmissions between the UE 604 and the serving cell 602 may use a refined transmission and reception beam pair different than the reported beams in RRM measurement. Thus, the present application provides a way to address inaccuracies in measurement of the DL-to-DL inter-cell interference 606. It may be advantageous to perform one or more additional interference measurements to enhance the accuracy of the measurement of the DL-to-DL inter-cell interference 606 and to more effectively manage interference from the neighbor cell 642.

FIG. 6B is a diagram 600*b* illustrating an example of a UL-UL inter-cell interference 607. As shown in FIG. 6B, a UL transmission 613 from a UE 604 toward its serving cell 602 may be interfered by another UL transmission from a second UE 644 targeted to the neighbor cell 642, thus introducing the UL-UL inter-cell interference 607, for example, $h_{12}$ as illustrated in FIG. 6B. UL-to-UL inter-cell interference 607 is not estimated accurately from the current RRM measurements when DL/UL reciprocity does not exist. The current RRM measurements are based on DL reference signals (e.g., SSB or CSI-RS). For example, the second UE 644 that is served by a neighbor cell 642 may provide an RRM measurement report of a downlink signal from the cell 602. When DL/UL reciprocity does not hold, the measurement of a downlink reference signal from the cell 602 to the second UE 644 cannot provide an accurate estimation of interference due to an uplink transmission from the second UE 644. As presented herein, one or more additional measurements may be performed by the serving cell 602 based on UL reference signals, such as SRS, from the second UE 644 that is served by the neighbor cell 642. Thus, the base station may be configured to support measurement of SRS from the second UE 644 of the neighbor cell 642 and to use the measurement to estimate UL-UL interference caused by the second UE 644. It may be advantageous to perform the one or more additional measurements to measure the UL-to-UL inter-cell interference 607 in order to more effectively manage interference from the neighbor cell 642.

FIG. 6C is a diagram 600c illustrating an example of a cross-UL-to-DL interference 608. Aspects presented herein improve interference management by having the UE measure cross-link inter-cell interference. As shown in FIG. 6C, a DL transmission 611, for example, $h_{11}$ as illustrated in FIG. 6C, from a serving cell 602 to a UE 604 may be interfered by another UL transmission from a second UE 644 to a neighbor cell 642. The UE 604 may be configured to measure the cross-UL-to-DL interference 608, for example, $h_{12}$ as illustrated in FIG. 6C. To handle this type of interference, the UE 604 may be configured to have the capability to measure the UL transmission from the second UE 644, an interfering UE, and to report the cross-UL-to-DL interference 608 to its serving cell 602. It may be advantageous to configure the UE 604 to perform the one or more additional measurements to measure the cross-UL-to-DL interference 608 in order to more effectively manage interference from the neighbor cell 642.

FIG. 6D is a diagram illustrating an example 600d of a cross-DL-to-UL interference 609. As shown in FIG. 6D, a UL transmission 613, for example, $h_{11}$ as illustrated in FIG. 6D, from a UE 604 to a serving cell 602 may be interfered by a DL transmission from a neighbor cell 642 to a second UE 644. Aspects presented herein improve interference management by having the serving cell measure the cross-DL-to-UL interference 609, for example, $h_{21}$ as illustrated in FIG. 6D. To handle this type of interference, a serving cell 602, e.g., a gNB-DU, may be provided with the capability to measure the DL transmission from the neighbor cell 642, an interfering DU's DL transmission. A DU may report the cross-DL-to-UL interference 609 to a CU, for example. It may be advantageous to configure the DU to perform the one or more additional measurements to measure the cross-DL-to-UL interference 609 in order to more effectively manage interference from the neighbor cell 642.

Figure 7:
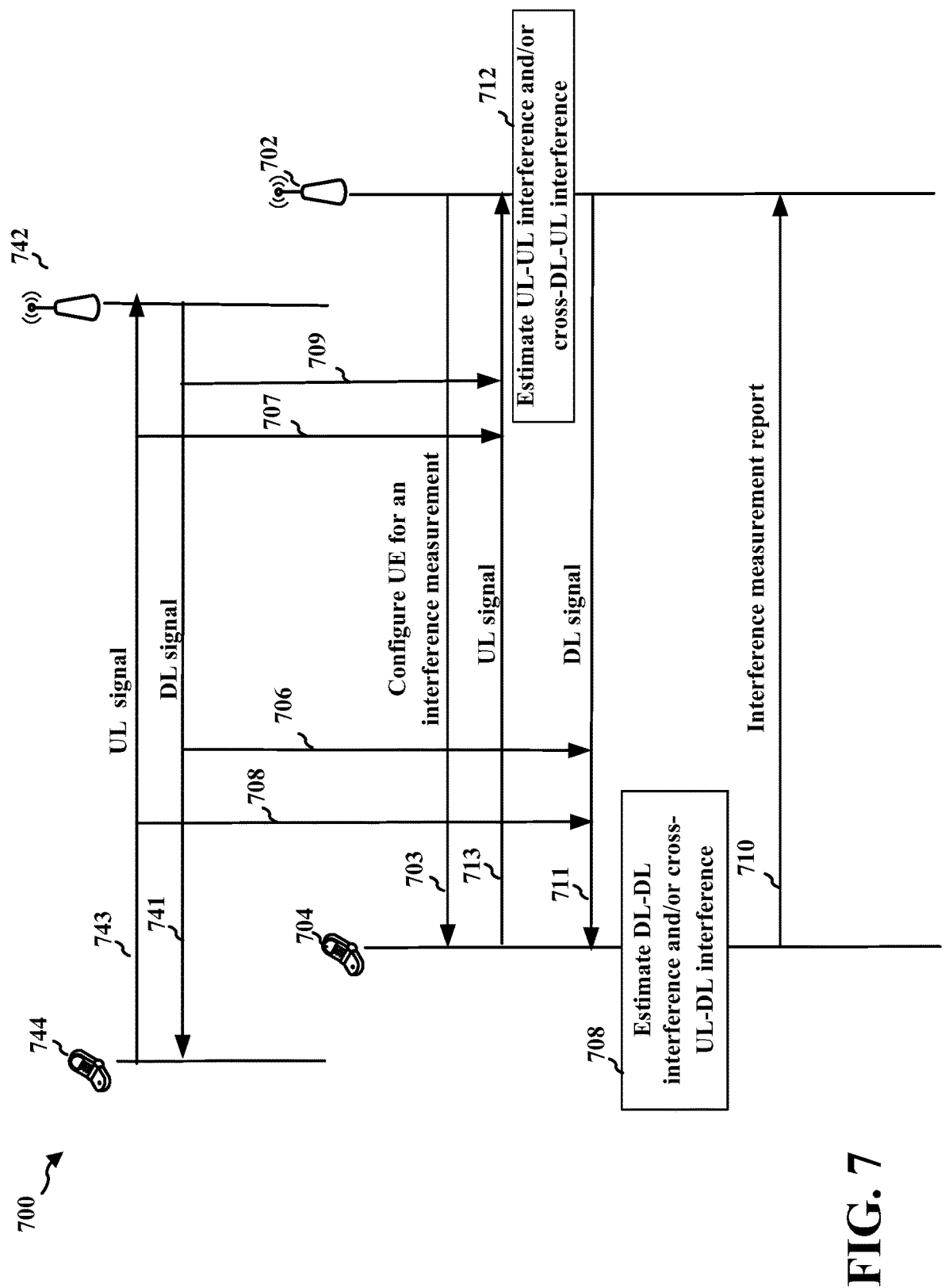
FIG. 7 is a flow diagram illustrating an example solution to perform a RRM measurement for interference management with an enhanced accuracy.

FIG. 7 is a flow diagram 700 illustrating an example solution to perform an interference measurement to solve the problems discussed above. In some aspects, a UE 704 performs the interference measurement. The UE 704 detects a DL signal 711 from a serving cell 702, a DL signal 741 from a neighbor cell 742, or a UL signal 743 from a second UE 744 in the neighbor cell 742, where the signal 741 from the neighbor cell 742 and the signal 743 from the second UE 744 interferer with communication between the UE 704 and the serving cell 702. The serving cell 702, or other network component, may configure the UE 704 to perform the interference measurement to detect the signals 711, 741, 743 from the serving cell 702, the neighbor cell 742, or the second UE 744 in the neighbor cell 742, as illustrated at 703. A network can include an access network, a backhaul network, and IAB, etc.

As shown in FIG. 7, the serving cell 702, as a network component, may configure the UE 704 to perform the interference measurement as illustrated at 703. The UE 704 estimates at least one of a DL-DL interference 706, as illustrated at 706, and/or a cross-UL-DL interference 708 of the neighbor cell 742 or the second UE 744 in the neighbor cell 742, as illustrated at 708.

In some aspects, the interference measurement may be performed based on a beam measurement at a physical layer (PHY). For example, the beam measurement report can be configured once the UE 704 has reported the neighbor cell 742 in a RRM measurement report. The beam measurement report may include an L1 beam measurement report. For example, in the beam-measurement report configuration, a channel state information-interference measurement (CSI-IM) resource can be allocated to measure the interference from reported neighbor cell. In this case, the UE 704 may use the same reception beam from the serving cell 702 to measure the DL-DL interference 706 from the neighbor cell 742. The UE 704 may estimate the DL-DL interference 706 of the neighbor cell 742 based on the same reception beam from the serving cell 702. For another example, when a refined beam is used for a DL data transmission from the serving cell 702, a CSI-RS resource for a channel measurement may be configured to be spatial Quasi co-located with the refined beam to improve the accuracy of the measurement of the DL-DL interference 706.

Referring to FIG. 5A, FIG. 5C, FIG. 6A and FIG. 7, the network architecture comprising the serving cell 702 can include a CU (e.g., 501, 520), one or more DUs (e.g., 503, 522, 526, 528), and an F1 interface between the CU and the one or more DUs. The beam-management report can be an L1-measurement, is transmitted to the one or more DUs. Additionally, information from the beam management report may be provided from the DU(s) to the CU. For example, a new message at F1-AP may be provided for the DU(s) to forward at least part of the beam-measurement report to the CU. In one example, the DU(s) may forward processed results to the CU after processing beam management report(s).

In some aspects, the interference measurement may be performed based on a radio resource management (RRM) measurement at a radio resource control (RRC) layer. The interference measurement report may comprise an RRM measurement report that indicates a measurement quantity of the neighbor cell 742 based on the same reception beam on which the UE 704 receives the DL transmission from the serving cell 702. In the RRM measurement report for the neighbor cell 742, the new measurement quantity of the neighbor cell 742 may be defined for the UE 704 based on the same RX beam as the serving cell 702. The measurement quantity may comprise the DL-DL interference quantity 706.

For example, in the RRM measurement configuration, the new measurement quantity may be enabled or disabled. For example, the RRM measurement configuration may comprise a bit that is added to enable or disable this new measurement quantity. The network 702 may transmit an indication to the UE 704 to enable or disable the measurement quantity 706.

In some aspects, a measurement may be performed to address an UL-to-UL interference 707 without DL/UL reciprocity. Referring to FIG. 5A, FIG. 5C, FIG. 6B and FIG. 7, the serving cell 702, may be configured to detect an uplink reference signal 743 from the second UE 744 in the neighbor cell 742 for estimating UL-to-UL interference to uplink communication from the UE 704 to the serving cell 702. The uplink reference signal may comprise a sounding reference signal (SRS) from the second UE 744. The DU may support the measurement of the UL reference signal, e.g. SRS, from the neighbor cell's UE 744. The CU may configure the DU to perform the measurement of the UL-to-UL interference 707. The DU may estimate a measurement quantity of the uplink-uplink interference. The DU may report the measurement to the CU. New messages may be used at the F1-AP in order for the CU to configure the DU to perform the measurement of the UL-to-UL interference and to report measurement information to the CU.

In some aspects, a measurement may be performed to address a cross-UL-to-DL interference 708. The serving cell 702, may configure the UE 704 to measure an uplink reference signal 743 for estimating the cross-uplink-downlink interference to the communication from the serving cell 702 to the UE 704. The uplink reference signal may comprise a sounding reference signal (SRS) from the second UE 704. The UE 704 may receive the configuration from the serving cell 702 to measure the uplink signal (e.g., SRS) from the second UE 744. The UE 704 may estimate the cross-uplink-downlink interference 708 of the uplink signal from the second UE 744 that interferes with a downlink communication to the UE 704 from the serving cell 702. The UE 704 may support the measurement of the UL reference signal, e.g. SRS, from the neighbor cell's UE 744. In the RRM measurement configuration, a new configuration field may be defined for the UE 704 to measure the UL transmission of the second UE 744, which may be an interfering UE. In the RRM measurement report, a new, cross UL-to-DL measurement quantity may be defined for the cross UL-to-DL interference 708.

In some aspects, a measurement may be performed to address a cross-DL-to-UL interference 709. The serving cell 702, may detect a downlink reference signal 741 from the neighbor cell 742 to the second UE 744 in order to estimate the cross-downlink-uplink interference 709 to the communication from the UE 704 to the serving cell 702. The downlink reference signal 741 may comprise a SSB or CSI-RS from the neighbor cell 742 to the second UE 744. A DU may support the measurement of the DL reference signal, e.g., SSB or CSIRS, from the neighbor cell 742 to the second UE 744. The CU may configure the DU to perform the measurement of the cross-DL-to-UL interference 709. The DU may estimate a measurement quantity of the cross-downlink-uplink interference 709, as illustrated at 712. The DU may further report the measurement to the CU. A new F1-AP message may be used for the CU to configure the DU and for the DU to report the measurement to the CU.

The UE 704 may further transmit an interference measurement report to the serving cell 702, as illustrated at 710. The network 702 may receive the interference measurement report from the UE 704, where the interference measurement report may comprise an indication of at least one of the DL-DL interference and the cross-UL—DL interference of the neighbor cell 742 or the second UE 744.

Figure 8:
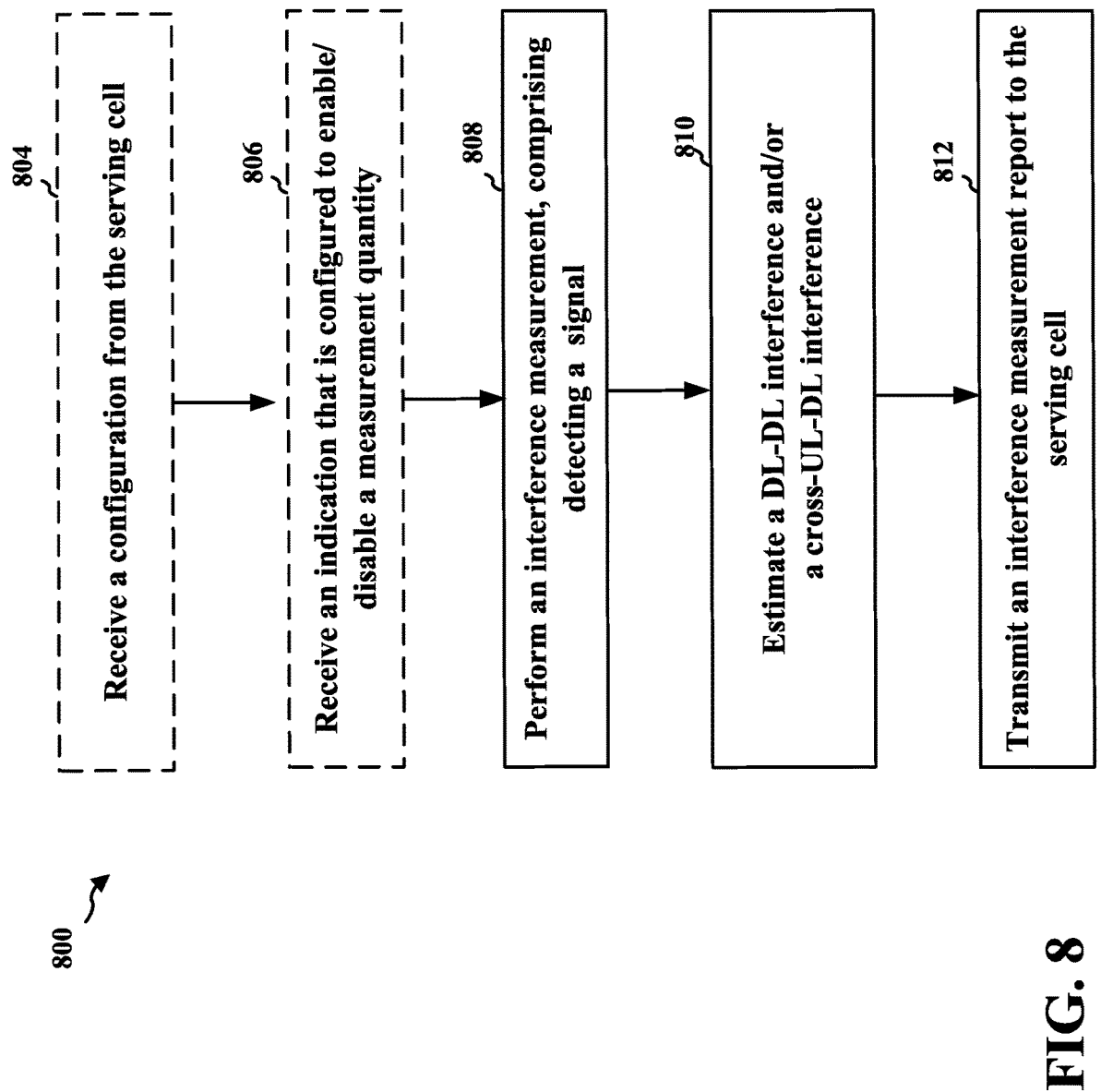
FIG. 8 is a flowchart of a method of wireless communication.

FIG. 8 is a flowchart 800 of a method of wireless communication. The method may be performed by a UE (e.g., UE 104, 350, 404, 604, 704, 1204, the apparatus 904, 904'; the processing system 1014, which may include the memory 360 and which may be the entire UE 350 or a component of the UE 350, such as the TX processor 368, the RX processor 356, and/or the controller/processor 359) communicating with a serving cell (e.g., base station 102, 180, 402, 602, 702, 950, the apparatus 1202, 1202'). The wireless communication may comprise 5G NR communication, e.g., mmW communication, as described herein.

Aspects may also be applied in other wireless communication, in other examples. Optional aspects are illustrated with a dashed line. Aspects presented herein may improve accuracy of the UE's measurements in order to provide more effective interference management.

As 804, the UE may receive a configuration to perform the interference measurement for the serving cell. For example, referring back to FIG. 7, the serving cell 702, as a network component, may configure the UE 704 to perform the interference measurement as illustrated at 703. As an example, the UE may receive a configuration for a beam measurement report to measure a downlink-downlink interference based on a same reception beam from the serving cell. For example, a CSI-IM resource may be allocated to perform the interference measurement of the downlink-downlink interference. For example, when a refined beam is used for a downlink data transmission from the serving cell, a CSI-RS resource for a channel measurement may be configured to be spatial Quasi co-located with the refined beam. As another example, the UE may receive a configuration from the serving cell to measure a cross-uplink-downlink interference of an uplink signal from a second UE that interferes with a downlink communication to the UE from the serving cell. For example, the uplink signal may comprise an SRS from the second UE. A report of the RRM measurement may indicate a measurement quantity of the cross-uplink-downlink interference.

As 806, the UE may receive an indication from the serving cell that is configured to enable or disable a measurement quantity. For example, referring back to FIG. 7, the RRM measurement configuration may comprise a bit that is added to enable or disable the measurement quantity. The network 702 may transmit an indication to the UE 704 to enable or disable the measurement quantity 706. The measurement quantity may be based on a same reception beam on which the UE receives a downlink transmission from the serving cell. The measurement quantity may comprise a downlink-downlink interference quantity.

At 808, the UE performs an interference measurement. The UE detects a signal from a serving cell, a neighbor cell, or a second UE served by the neighbor cell, where the signal from the neighbor cell or the second UE is interfering with communication between the UE and the serving cell. For example, referring back to FIG. 7, UE 704 detects a DL signal 711 from a serving cell 702, a DL signal 741 from a neighbor cell 742, or a UL signal 743 from a second UE 744 in the neighbor cell 742, where the signal 741 from the neighbor cell 742 and the signal 743 from the second UE 744 interferer with communication between the UE 704 and the serving cell 702. For example, the interference measurement may be performed based on a radio resource management (RRM) measurement at a radio resource control (RRC) layer. For example, the interference measurement is performed based on a beam measurement at a physical layer (PHY).

At 810, the UE estimates at least one of a downlink-downlink interference and a cross-uplink-downlink interference of the neighbor cell or the second UE in the neighbor cell. For example, the UE may estimate the downlink-downlink interference of the neighbor cell based on a same reception beam from the serving cell. For example, the UE may estimate the cross-uplink-downlink interference of an uplink signal from the second UE that interferes with a downlink communication to the UE from the serving cell. For example, referring back to FIG. 7, the UE 704 estimates at least one of a DL-DL interference 706, as illustrated at 706, and/or a cross-UL-DL interference 708 of the neighbor cell 742 or the second UE 744 in the neighbor cell 742, as illustrated at 708.

At 812, the UE transmits an interference measurement report to the serving cell. For example, referring back to FIG. 7, the UE 704 may further transmit an interference measurement report to the serving cell 702, as illustrated at 710. The network 702 may receive the interference measurement report from the UE 704, where the interference measurement report may comprise an indication of at least one of the DL-DL interference and the cross-UL—DL interference of the neighbor cell 742 or the second UE 744. The report may comprise an interference measurement that indicates the measurement quantity of the neighbor cell for the UE based on the same reception beam on which the UE receives a downlink transmission from the serving cell. The measurement quantity may comprise the downlink-downlink interference quantity.

Thus, the method provides a way to address inaccuracies in measurement of the DL-to-DL inter-cell interference. It is advantageous for the UE to perform one or more additional interference measurements to enhance the accuracy of the measurement of the DL-to-DL inter-cell interference and to more effectively manage interference from the neighbor cell.

Figure 9:
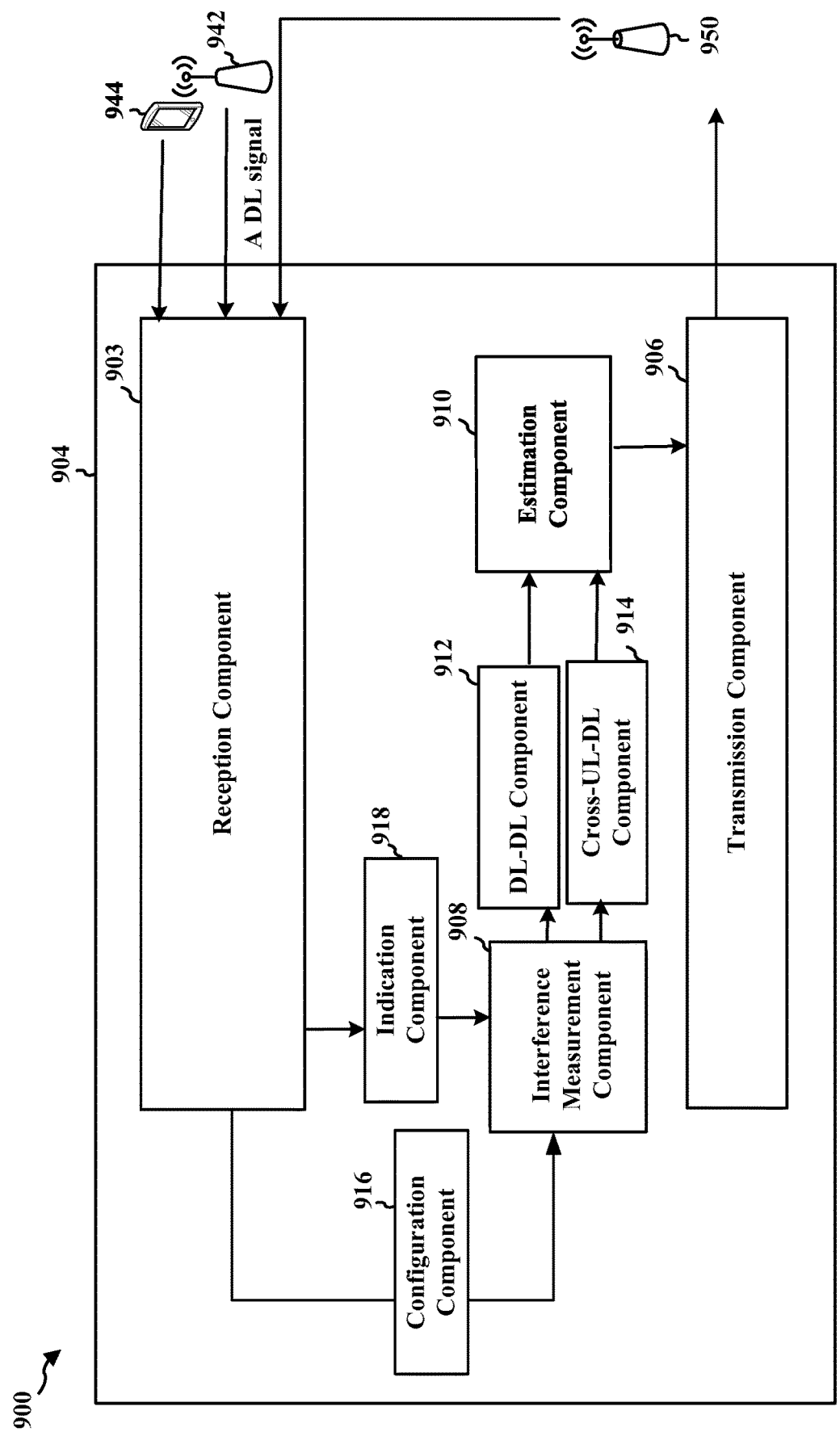
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 904. The apparatus may be a UE (e.g., UE 104, 350, 404, 704, 1204) communicating with a serving cell 950 (e.g., base station 102, 180, 402, 702, the apparatus 1202, 1202'). The wireless communication may comprise NR communication, e.g., mmW communication, as described herein. Aspects may also be employed in other wireless communication. The apparatus 904 includes a reception component 903 that receives a signal from a serving cell 950, and/or a neighbor cell 942, and/or a second UE 944 in the neighbor cell 942. The apparatus 904 includes an interference measurement component 908 that performs an interference measurement, as described in connection with 808. The apparatus 904 may include a DL-DL component 912 that measures a DL-DL interference. The apparatus 904 may include a Cross-UL-DL component 914 that measures a Cross-UL-DL interference. The apparatus 904 includes an estimation component 910 that estimates at least one of a downlink-downlink interference and a cross-uplink-downlink interference of the neighbor cell 942 or the second UE 944 in the neighbor cell 942, as described in connection with 810. The apparatus 904 includes a transmission component 906 that transmits uplink communication to a serving cell, e.g., that may include an interference measurement report to the serving cell 950, as described in connection with 812. The apparatus may further include a configuration component 916 that receives configuration for the measurement/estimation, as described in connection with 804. The apparatus may include an indication component 918 configured to receive an indication that enables/disables a measurement quantity, as described in connection with 806. Aspects of the above components are described in connection with FIG. 7.

The apparatus 940 may include additional components that perform each of the blocks of the algorithm in the aforementioned flowcharts of FIGS. 7 and 8. As such, each block in the aforementioned flowcharts of FIGS. 7 and 8 may be performed by a component and the apparatus 904 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
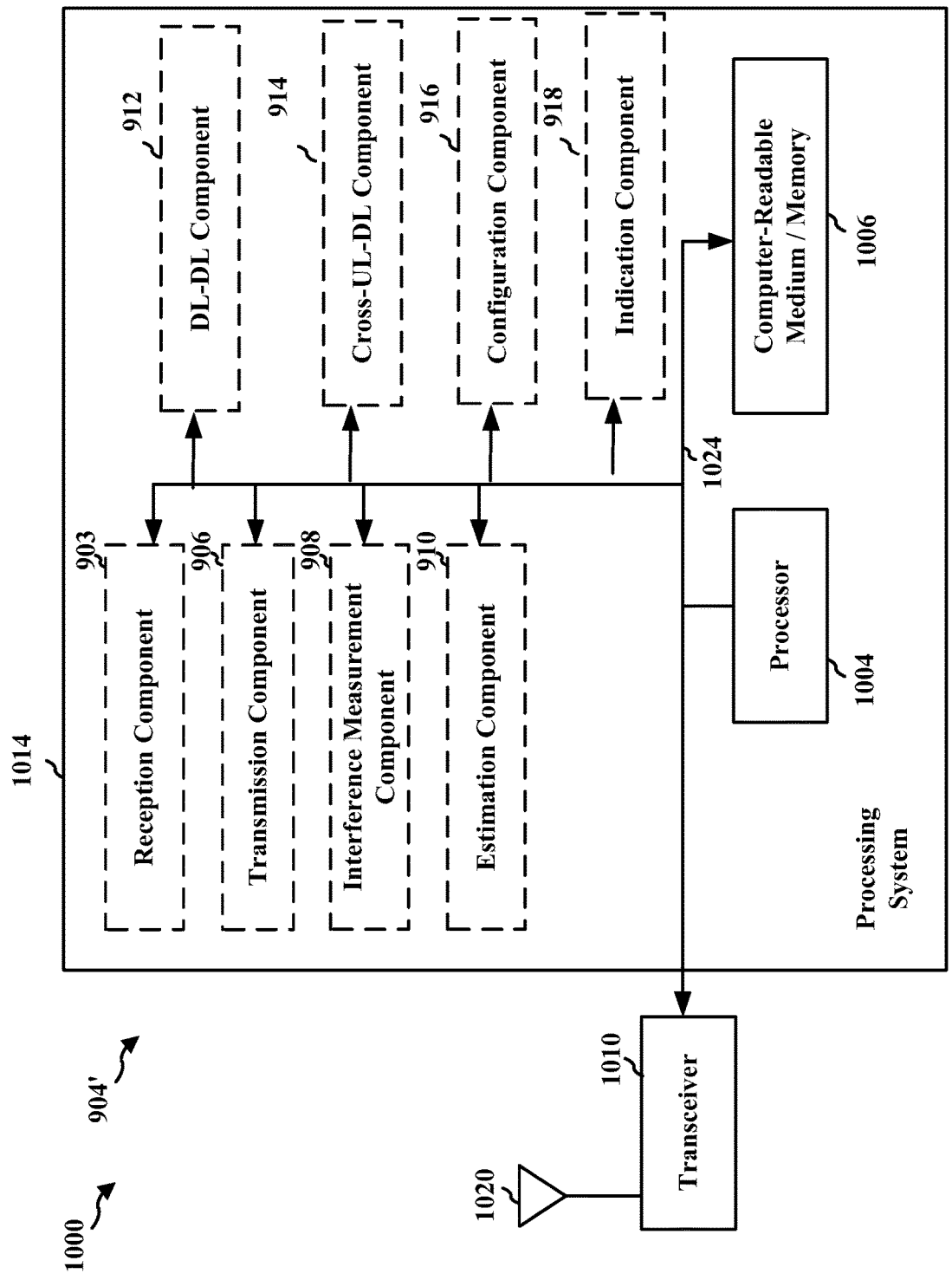
FIG. 10 is a diagram illustrating an example of a hardware implementation for an apparatus employing a processing system.

FIG. 10 is a diagram 1000 illustrating an example of a hardware implementation for an apparatus 904' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 903, 906, 908, 910, 912, 914, 916, 918 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 903. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1104, causes the processing system 1014 to perform the various functions described supra for any particular apparatus. The computer-readable medium/memory 1006 may also be used for storing data that is manipulated by the processor 1104 when executing software. The processing system 1014 further includes at least one of the components 903, 906, 908, 910, 912, 914, 916, 918. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the apparatus 904/904' for wireless communication includes means for performing an interference measurement, wherein the means for performing the interference measurement is configured to detect a signal from a serving cell, a neighbor cell, or a second UE in the neighbor cell, the signal from the neighbor cell or the second UE interfering with communication between the UE and the serving cell; means for estimating at least one of a downlink-downlink interference and a cross-uplink-downlink interference of the neighbor cell or the second UE in the neighbor cell; and means for transmitting an interference measurement report to the serving cell. The aforementioned means may be one or more of the aforementioned components of the apparatus 904 and/or the processing system 1014 of the apparatus 904' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11A:
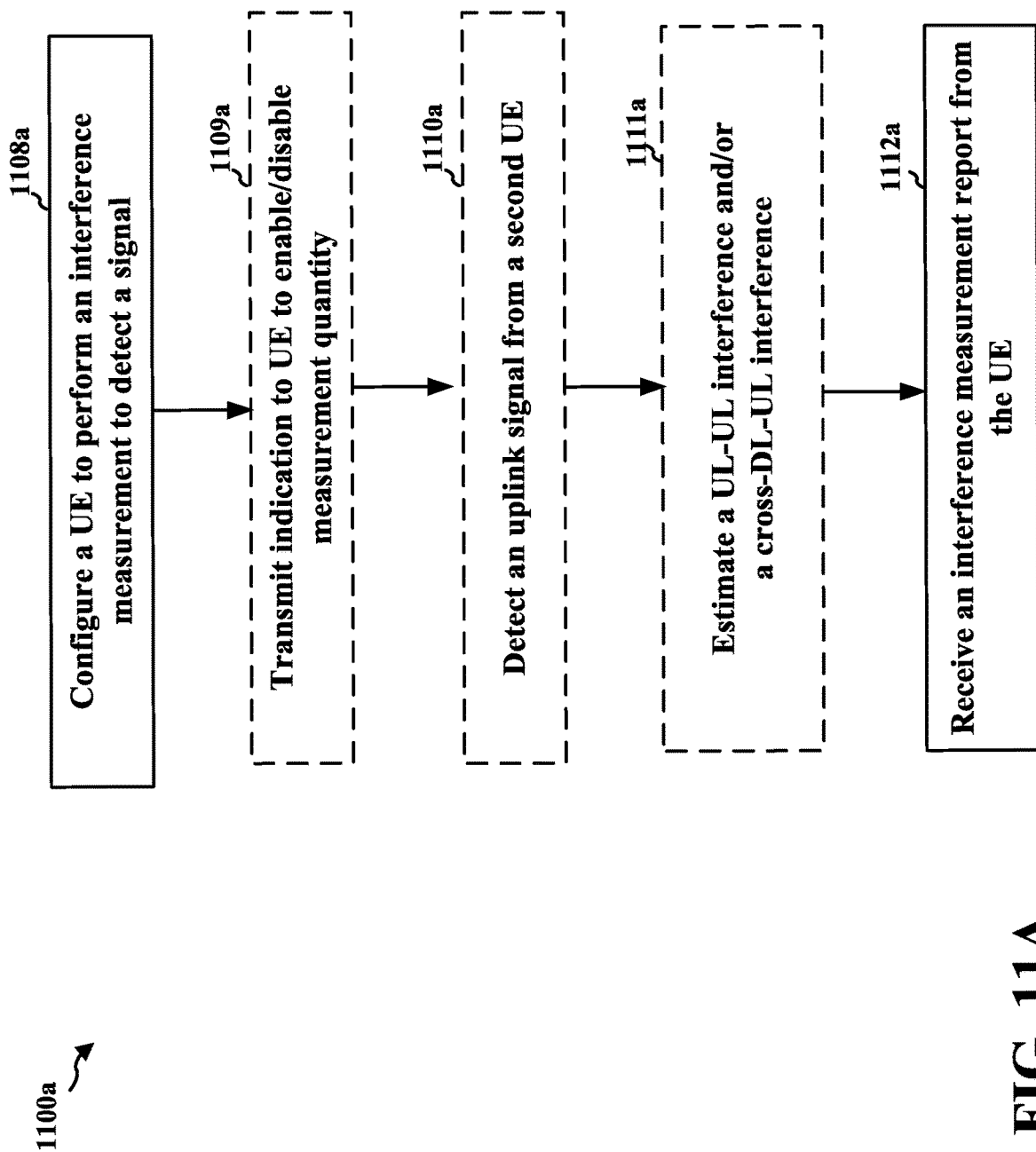
FIG. 11A is a flowchart of a method of wireless communication.

FIG. 11A is a flowchart 1100*a* of a method of wireless communication. The method may be performed by a serving cell (e.g., base station 102, 180, 402, 602, 702, 950; the apparatus 1202, 1202'; the processing system 1314, which may include the memory 376 and which may be the entire base station 310 or a component of the base station 310, such as the TX processor 316, the RX processor 370, and/or the controller/processor 375) communicating with a UE (e.g., UE 104, 350, 404, 604, 704, 1204, the apparatus 904, 904'). The wireless communication may comprise 5G NR communication, e.g., mmW communication, as described herein. Aspects may also be applied in other wireless communication, in other examples. Optional aspects are illustrated with a dashed line. The method described herein may improve accuracy of interference measurements, thereby providing more effective interference management.

At 1108*a*, the serving cell configures a UE to perform an interference measurement to detect a signal from the serving cell, a neighbor cell, or a second UE in the neighbor cell, where the signal from the neighbor cell or the second UE interferes with communication between the UE and the serving cell. For example, the network may comprise a CU (e.g., 501, 520) and one or more DUs (e.g., 503, 522, 526, 528). For example, referring back to FIG. 7, the serving cell 702, as a network component, may configure the UE 704 to perform the interference measurement as illustrated at 703. Referring to FIG. 5A, FIG. 5C, FIG. 6A and FIG. 7, the network architecture comprising the serving cell 702 can include a CU (e.g., 501, 520), one or more DUs (e.g., 503, 522, 526, 528), and an F1 interface between the CU and the one or more DUs. It may be advantageous to configure the UE to perform one or more additional measurements to measure the interference in order to more effectively manage interference from the neighbor cell.

The signal may comprise at least one of a downlink signal from the serving cell, a downlink signal from the neighbor cell to the second UE in the neighbor cell, and an uplink signal from the second UE to the neighbor cell. For example, referring back to FIG.7, the UE 704 may detect a DL signal 711 from a serving cell 702, a DL signal 741 from a neighbor cell 742, or a UL signal 743 from a second UE 744 in the neighbor cell 742, where the signal 741 from the neighbor cell 742 and the signal 743 from the second UE 744 interferer with communication between the UE 704 and the serving cell 702. The serving cell 702, or other network component, may configure the UE 704 to perform the interference measurement to detect the signals 711, 741, 743 from the serving cell 702, the neighbor cell 742, or the second UE 744 in the neighbor cell 742, as illustrated at 703.

The interference measurement may be performed based on a RRM measurement at a RRC layer. For example, referring back to FIG. 7, the interference measurement may be performed based on a beam measurement at a physical layer (PHY). For example, the beam measurement report can be configured once the UE 704 has reported the neighbor cell 742 in a RRM measurement report.

The UE may be configured to estimate the downlink-downlink interference of the neighbor cell based on a same reception beam from the serving cell. For example, referring back to FIG. 7, the beam measurement report may include an L1 beam measurement report. For example, in the beam-measurement report configuration, a CSI-IM resource can be allocated to measure the interference from reported neighbor cell. In this case, the UE 704 may use the same reception beam from the serving cell 702 to measure the DL-DL interference 706 from the neighbor cell 742. The UE 704 may estimate the DL-DL interference 706 of the neighbor cell 742 based on the same reception beam from the serving cell 702.

For example, upon receiving a RRM measurement report from the UE indicating a DL-DL interference from the neighbor cell, the base station may configure, based on the CU, the UE for a beam measurement report to measure the DL-DL interference based on a same reception beam from the receiving cell. The beam-management report can be an L1-measurement, is transmitted to the one or more DUs. Additionally, information from the beam management report may be provided from the DU(s) to the CU. For example, a new message at F1-AP may be provided for the DU(s) to forward at least part of the beam-measurement report to the CU. In one example, the DU(s) may forward processed results to the CU after processing beam management report(s).

For example, a CSI-IM resource in the beam measurement report may be allocated to perform the interference measurement of the downlink-downlink interference. When a refined beam is used for a downlink data transmission from the serving cell, a CSI-RS resource for a channel measurement may be configured to be spatial Quasi co-located with the refined beam. For example, referring back to FIG. 7, when a refined beam is used for a DL data transmission from the serving cell 702, a CSI-RS resource for a channel measurement may be configured to be spatial Quasi co-located with the refined beam to improve the accuracy of the measurement of the DL-DL interference 706.

The base station may configure the UE, e.g., at 1108*a*, to measure an uplink reference signal for estimating the cross-UL-DL interference to the communication from the serving cell to the UE. The uplink reference signal may comprise an SRS from the second UE. A report of the RRM measurement, e.g., received at 1112*a*, may indicate a measurement quantity of the cross-UL-DL interference. For example, referring back to FIG. 7, the serving cell 702, may configure the UE 704 to measure an uplink reference signal 743 for estimating the cross-uplink-downlink interference to the communication from the serving cell 702 to the UE 704. The uplink reference signal may comprise a sounding reference signal (SRS) from the second UE 704. The UE 704 may receive the configuration from the serving cell 702 to measure the uplink signal (e.g., SRS) from the second UE 744. The UE 704 may estimate the cross-uplink-downlink interference 708 of the uplink signal from the second UE 744 that interferes with a downlink communication to the UE 704 from the serving cell 702. The UE 704 may support the measurement of the UL reference signal, e.g. SRS, from the neighbor cell's UE 744. In the RRM measurement configuration, a new configuration field may be defined for the UE 704 to measure the UL transmission of the second UE 744, which may be an interfering UE. In the RRM measurement report, a new, cross UL-to-DL measurement quantity may be defined for the cross UL-to-DL interference 708.

At 1109*a*, the serving cell may transmit a measurement quantity indication to the UE to enable or disable a measurement quantity. The UE may be configured to detect a measurement quantity of the downlink-downlink interference based on a same reception beam from the serving cell. For example, referring back to FIG. 7, the RRM measurement configuration may comprise a bit that is added to enable or disable this new measurement quantity. The network 702 may transmit an indication to the UE 704 to enable or disable the measurement quantity 706.

At 1110a, the serving cell or DU, may detect an uplink reference signal from the second UE in the neighbor cell for estimating an uplink-uplink interference to communication from the UE to the serving cell. The uplink reference signal may comprise a SRS from the second UE. A beam measurement report from the UE may be received, by the one or more DUs. At least part of the beam measurement report received from the UE may be forwarded to the CU by the one or more DUs. For example, referring back to FIG. 5A, FIG. 5C, FIG. 6B and FIG. 7, the serving cell 702, may be configured to detect an uplink reference signal 743 from the second UE 744 in the neighbor cell 742 for estimating UL-to-UL interference to uplink communication from the UE 704 to the serving cell 702.

At 1111a, the serving cell may estimate a UL-UL interference and/or a cross-DL-UL interference. For example, a CU may configure the DU to detect the uplink reference signal, as described in connection with FIGS. 11B and 11C. The DU may report the uplink reference signal to the CU. As an example, referring back to FIG. 7, the uplink reference signal may comprise a SRS from the second UE 744. The DU may support the measurement of the UL reference signal, e.g. SRS, from the neighbor cell's UE 744. The CU may configure the DU to perform the measurement of the UL-to-UL interference 707. The DU may estimate a measurement quantity of the uplink-uplink interference. The DU may report the measurement to the CU. New messages may be used at the F1-AP in order for the CU to configure the DU to perform the measurement of the UL-to-UL interference and to report measurement information to the CU. As an example, referring back to FIG. 7, the serving cell 702, may detect a downlink reference signal 741 from the neighbor cell 742 to the second UE 744 in order to estimate the cross-downlink-uplink interference 709 to the communication from the UE 704 to the serving cell 702. The downlink reference signal 741 may comprise a SSB or CSI-RS from the neighbor cell 742 to the second UE 744. A DU may support the measurement of the DL reference signal, e.g., SSB or CSIRS, from the neighbor cell 742 to the second UE 744. The CU may configure the DU to perform the measurement of the cross-DL-to-UL interference 709. The DU may estimate a measurement quantity of the cross-downlink-uplink interference 709, as illustrated at 712. The DU may further report the measurement to the CU. A new F1-AP message may be used for the CU to configure the DU and for the DU to report the measurement to the CU.

At 1112a, the serving cell receives an interference measurement report from the UE, the interference measurement report comprising an indication of at least one of a downlink-downlink interference and a cross-uplink-downlink interference of the neighbor cell or the second UE in the neighbor cell. For example, referring back to FIG. 7, the UE 704 may further transmit an interference measurement report to the serving cell 702, as illustrated at 710. The network 702 may receive the interference measurement report from the UE 704, where the interference measurement report may comprise an indication of at least one of the DL-DL interference and the cross-UL—DL interference of the neighbor cell 742 or the second UE 744.

Figure 11B:
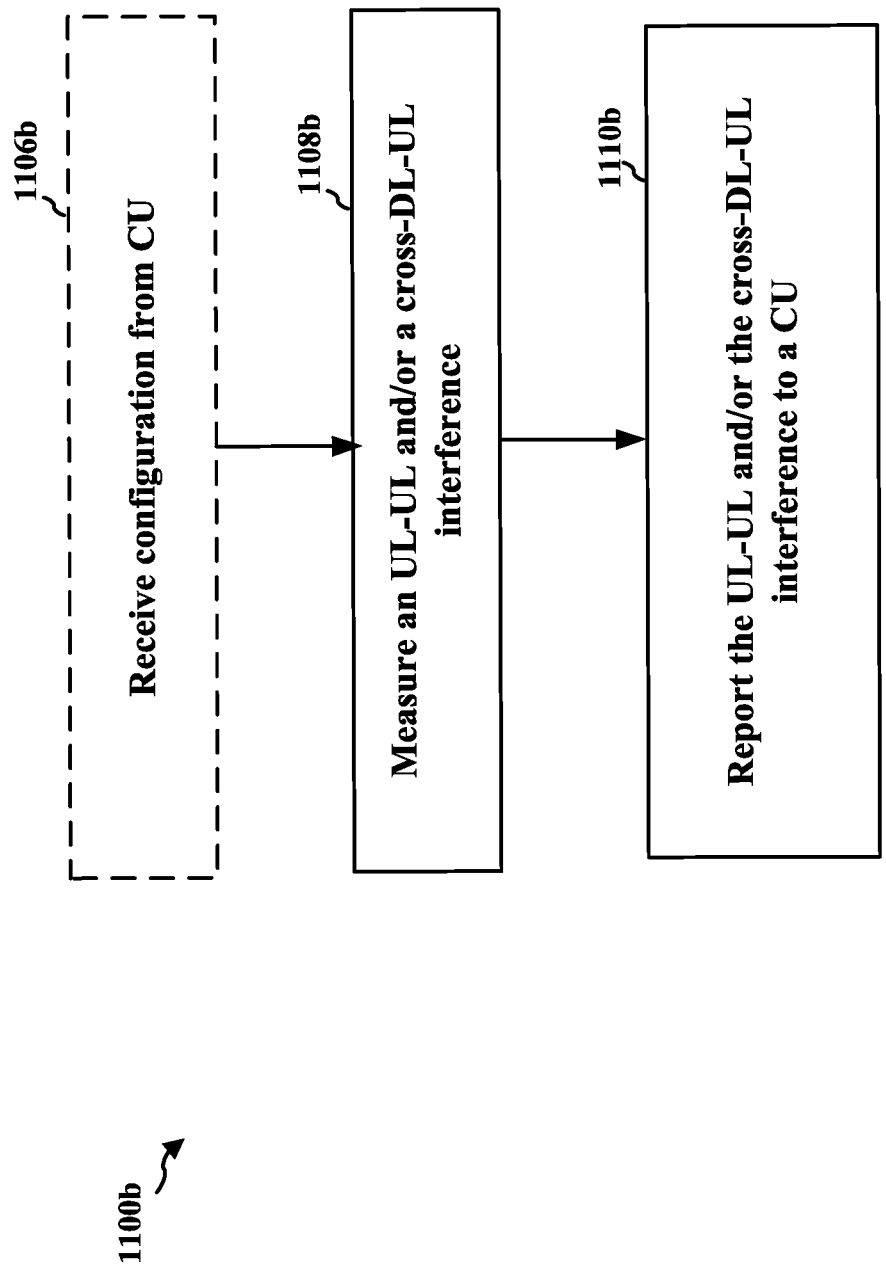
FIG. 11B is a flowchart of a method of wireless communication.

FIG. 11B is a flowchart of a method 1100b of wireless communication. The method may be performed by a DU (e.g., 503) of a serving cell communicating with a UE (e.g., UE 104, 350, 404, 604, 704, 1204, the apparatus 904, 904'). The method may be performed by a base station 102, 180, 310; apparatus 120, 1202', the processing system 1314, which may include the memory 376 and which may be the entire base station 310 or a component of the base station 310, such as the TX processor 316, the RX processor 370, and/or the controller/processor 375. The wireless communication may comprise 5G NR communication, e.g., mmW communication, as described herein. Aspects may also be applied in other wireless communication, in other examples. The serving cell may be as a component of a network comprising a CU (e.g., 501, 520) and one or more DUs (e.g., 503, 522, 526, 528). For example, referring back to FIG. 5A, FIG. 5C, FIG. 6A and FIG. 7, the network architecture comprising the serving cell 702 can include a CU (e.g., 501, 520), one or more DUs (e.g., 503, 522, 526, 528), and an F1 interface between the CU and the one or more DUs. The DU may receive a configuration from a CU to perform one or more measurements to measure the interference. In this way, more effective interference management may be provided.

At 1106b, the DU may receive a configuration from the CU upon which a measurement at 1108b is based. For example, a CU may configure the DU to detect the uplink reference signal. For example, the DU may receive a configuration from the CU to detect a SRS from a second UE served by a neighbor cell as a part of measuring the uplink-uplink interference. Referring back to FIG. 7, the uplink reference signal may comprise a SRS from the second UE 744. The DU may support the measurement of the UL reference signal, e.g. SRS, from the neighbor cell's UE 744. The CU may configure the DU to perform the measurement of the UL-to-UL interference 707. New messages may be used at the F1-AP in order for the CU to configure the DU to perform the measurement of the UL-to-UL interference and to report measurement information to the CU.

For another example, a CU may configure the DU to detect a cross-downlink-uplink interference. The DU may receive a configuration from the CU to detect a downlink reference signal from the neighbor cell to the second UE as a part of measuring the cross-downlink-uplink interference. The downlink reference signal may comprise a SSB or CSI-RS. The DU may receive a configuration from the CU configures the DU to measure an interfering DU's downlink transmission. Referring back to FIG. 7, the serving cell 702, may detect a downlink reference signal 741 from the neighbor cell 742 to the second UE 744 in order to estimate the cross-downlink-uplink interference 709 to the communication from the UE 704 to the serving cell 702. The downlink reference signal 741 may comprise a SSB or CSI-RS from the neighbor cell 742 to the second UE 744. A DU may support the measurement of the DL reference signal, e.g., SSB or CSIRS, from the neighbor cell 742 to the second UE 744. The CU may configure the DU to perform the measurement of the cross-DL-to-UL interference 709. A new F1-AP message may be used for the CU to configure the DU and for the DU to report the measurement to the CU.

At 1108b, the DU measures at least one of a uplink-uplink interference and a cross-downlink-uplink interference at the DU. The DU may measure the uplink-uplink interference and/or the interfering DU's downlink transmission that interferes with an uplink transmission from the UE. For example, referring to FIG. 7, the DU may estimate a measurement quantity of the uplink-uplink interference 707 and/or the cross-downlink-uplink interference 709, as illustrated at 712.

At 1110b, the DU reports the at least one of the uplink-uplink interference and the cross-downlink-uplink interference to a CU (e.g., 501). For example, the DU may report the measurement to the CU.

Figure 11C:
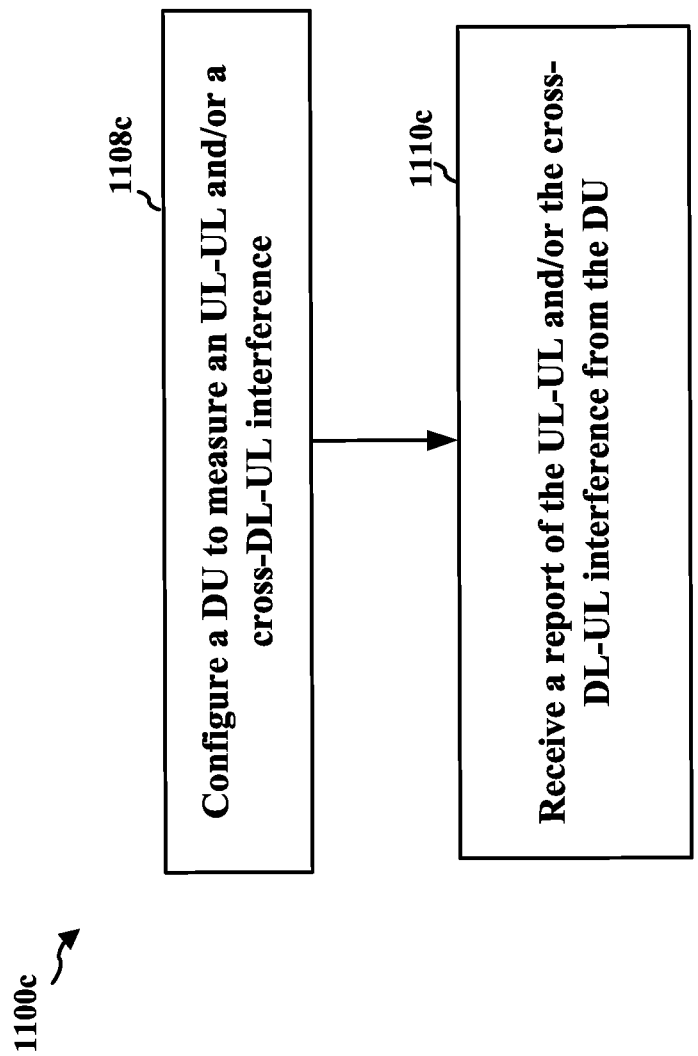
FIG. 11C is a flowchart of a method of wireless communication.

FIG. 11C is a flowchart of a method 1100c of wireless communication. The method may be performed by a CU (e.g., 501) of a serving cell (e.g., 501) interfacing with multiple Distributed Units (DUs), (e.g., 503) of the serving cell. The method may be performed by a base station 102, 180, 310; apparatus 120, 1202', the processing system 1314, which may include the memory 376 and which may be the entire base station 310 or a component of the base station 310, such as the TX processor 316, the RX processor 370, and/or the controller/processor 375. The wireless communication may comprise 5G NR communication, e.g., mmW communication, as described herein. Aspects may also be applied in other wireless communication, in other examples. The CU may configure the DU to perform one or more measurements to measure the interference. In this way, more effective interference management may be provided.

At 1108c, the CU configures at least one DU to measure at least one of an uplink-uplink interference and a cross-downlink-uplink interference at the DU. For example, the CU may configure the at least one DU to detect a SRS from a second UE served by a neighbor cell as a part of measuring the uplink-uplink interference. For another example, the CU may configure the at least one DU to measure an interfering DU's downlink transmission that interferes with an uplink transmission from a UE. The CU may configure the at least one DU to detect a downlink reference signal from the neighbor cell to the second UE as a part of measuring the cross-downlink-uplink interference. The downlink reference signal may comprise a SSB or CSI-RS.

At 1110c, the CU receives a report of the at least one of the uplink-uplink interference and the cross-downlink-uplink interference from the at least one DU.

Figure 12:
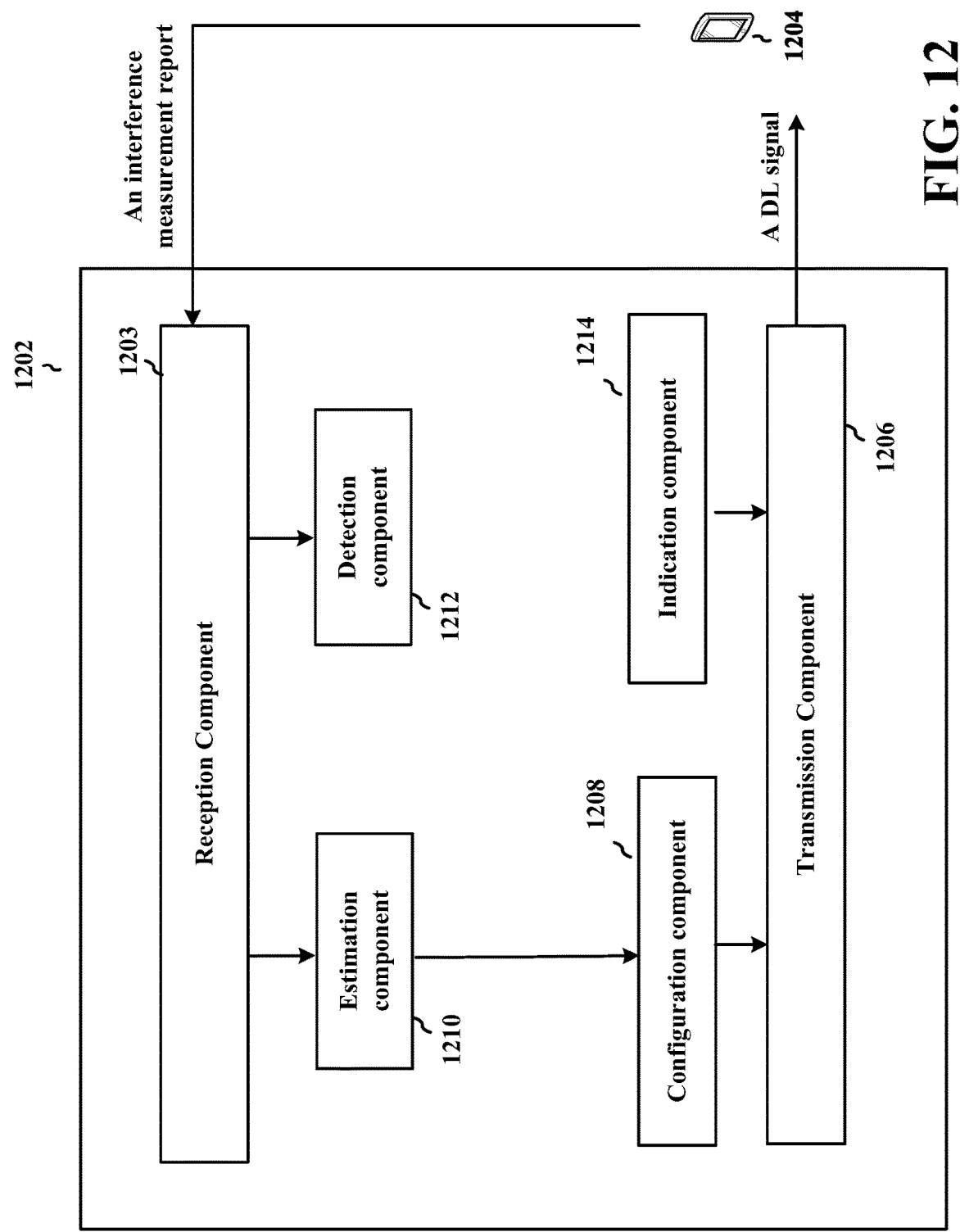
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a serving cell (e.g., base station 102, 180, 402, 602, 702, 950 communicating with a UE (e.g., UE 104, 350, 404, 604, 704, 1204, the apparatus 904, 904'). The wireless communication may comprise 5G NR communication, e.g., mmW communication, as described herein. The apparatus 1202 includes a transmission component 1206 configured to transmit a DL signal to a UE 1204. The apparatus 1202 includes a configuring component 1208 that configures the UE 1204 to perform an interference measurement to detect a signal from a serving cell, a neighbor cell, or a second UE in the neighbor cell. The apparatus 1202 includes a reception component 1203 that receives an interference measurement report from the UE, where the interference measurement report comprises an indication of at least one of a DL-DL interference and a cross-UL-DL interference of the neighbor cell or the second UE in the neighbor cell. The apparatus 1202 may include an estimating component 1210 that estimates a UL-UL interference and/or a cross-DL-UL interference. The apparatus may include a detection component 1212 configured to detect an uplink reference signal from the second UE in the neighbor cell for estimating an uplink-uplink interference to communication from the UE to the serving cell and/or a downlink reference signal from the neighbor cell to the second UE as a part of measuring the cross-DL-UL interference. The apparatus may include an indication component 1214 configured to transmit an indication to enable/disable a measurement quantity for interference measurement at a UE.

The apparatus may include additional components that perform each of the blocks of the algorithm in the aforementioned flowcharts of FIGS. 7 and 11A-11C. As such, each block in the aforementioned flowcharts of FIGS. 7 and 11A-11C may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
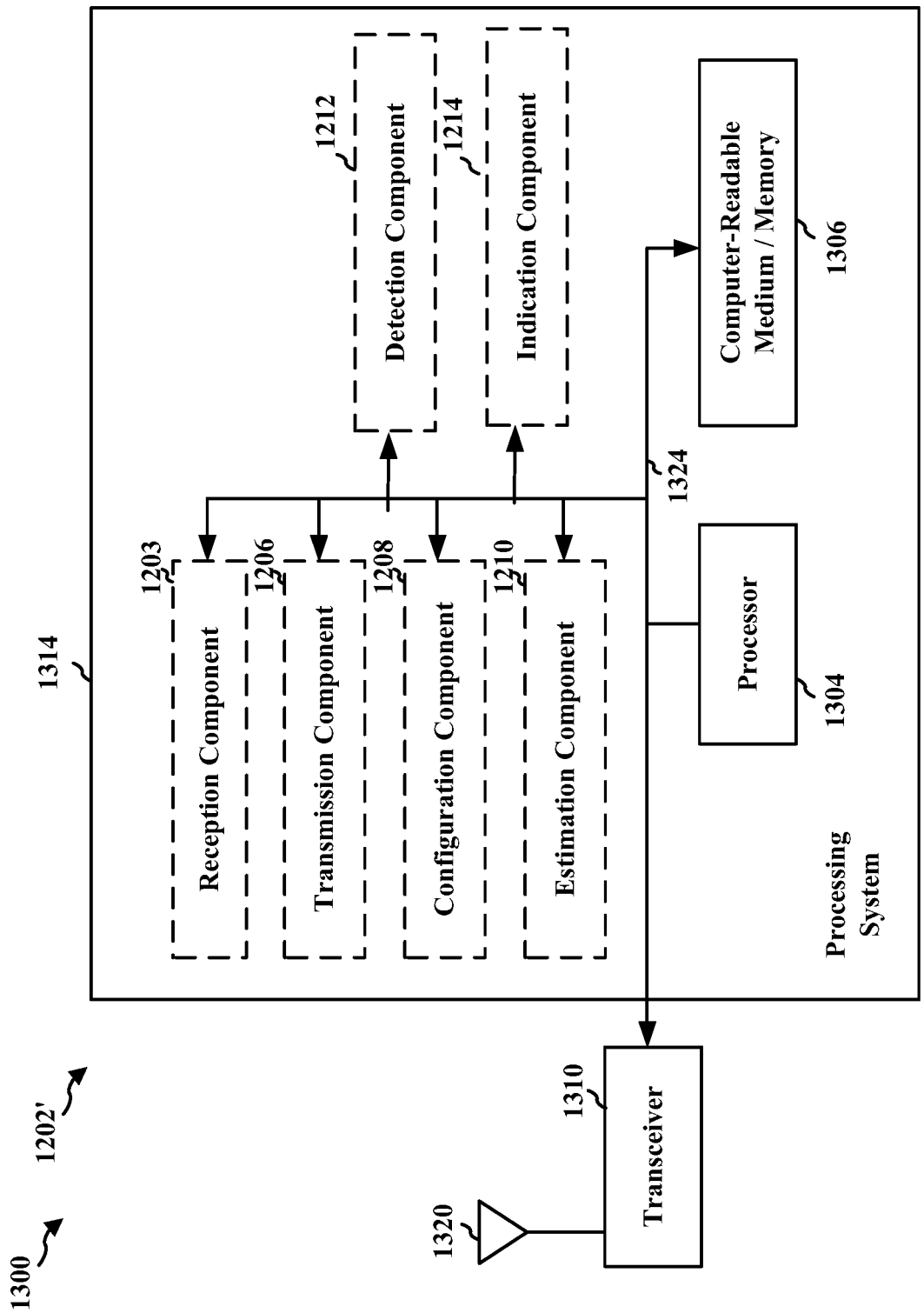
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1203, 1206, 1208, 1210, 1212, 1214, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1203. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375. Alternatively, the processing system 1314 may be the entire base station (e.g., see 310 of FIG. 3).

In one configuration, the apparatus 1202/1202' for wireless communication includes means for configuring a UE to perform an interference measurement to detect a signal from a serving cell, a neighbor cell, or a second UE in the neighbor cell, the signal from the neighbor cell or the second UE interfering with communication between the UE and the serving cell; and means for receiving an interference measurement report from the UE, the interference measurement report comprising an indication of at least one of a downlink-downlink interference and a cross-uplink-downlink interference of the neighbor cell or the second UE in the neighbor cell. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications for a user equipment (UE), comprising:
    transmitting an indication of a downlink-downlink interference of a neighbor cell;
    receiving, based on transmitted indication, a configuration for a beam measurement report to measure the downlink-downlink interference based on a same reception beam as used for communication between the UE and a serving cell;
    performing, based on the configuration, an interference measurement, comprising detecting a signal from the serving cell, the neighbor cell, or a second UE in the neighbor cell, the signal from the neighbor cell or the second UE interfering with communication between the UE and the serving cell;
    estimating the downlink-downlink interference of the neighbor cell, wherein the UE estimates the downlink-downlink interference of the neighbor cell based on the same reception beam as used for communication between the UE and the serving cell; and
    transmitting an interference measurement report to the serving cell, wherein the interference measurement report indicates the estimated downlink-downlink interference.

2. The method of claim 1, wherein the signal comprises at least one of a serving cell downlink signal from the serving cell, a neighbor cell downlink signal from the neighbor cell to the second UE in the neighbor cell, and an uplink signal from the second UE to the neighbor cell.

3. The method of claim 1, wherein the interference measurement is performed based on a radio resource management (RRM) measurement at a radio resource control (RRC) layer.

4. The method of claim 1, wherein the interference measurement is performed based on a beam measurement at a physical layer (PHY).

5. The method of claim 1, wherein a channel state information-interference measurement (CSI-IM) resource is allocated to perform the interference measurement of the downlink-downlink interference.

6. The method of claim 1, wherein, when a refined beam is used for a downlink data transmission from the serving cell, a CSI-RS resource for a channel measurement is configured to be spatial Quasi co-located with the refined beam.

7. The method of claim 1, wherein the interference measurement report comprises an radio resource management (RRM) measurement report that indicates a measurement quantity of the neighbor cell for the UE based on a same reception beam on which the UE receives a downlink transmission from the serving cell.

8. The method of claim 7, further comprising:
    receiving an indication from the serving cell that is configured to enable or disable the measurement quantity.

9. The method of claim 7, wherein the measurement quantity comprises a downlink-downlink interference quantity.

10. The method of claim 1, further comprising:
    estimating at least a cross-uplink-downlink interference of the second UE in the neighbor cell.

11. The method of claim 10, wherein the UE estimates the cross-uplink-downlink interference of an uplink signal from the second UE that interferes with a downlink communication to the UE from the serving cell, the method further comprising:

receiving a configuration from the serving cell to measure the uplink signal from the second UE.

12. The method of claim 10, wherein the uplink signal comprises a sounding reference signal (SRS) from the second UE and the interference measurement report indicates a measurement quantity of the cross-uplink-downlink interference.

13. An apparatus for wireless communication at a user equipment (UE), comprising:
means for transmitting an indication of a downlink-downlink interference of a neighbor cell;
receiving, based on transmitted indication, a configuration for a beam measurement report to measure the downlink-downlink interference based on a same reception beam as used for communication between the UE and a serving cell;
means for performing, based on the configuration, an interference measurement, wherein the means for performing the interference measurement is configured to detect a signal from the serving cell, the neighbor cell, or a second UE in the neighbor cell, the signal from the neighbor cell or the second UE interfering with communication between the UE and the serving cell;
means for estimating the downlink-downlink interference of the neighbor cell, wherein the UE estimates the downlink-downlink interference of the neighbor cell based on the same reception beam as used for communication between the UE and the serving cell; and
means for transmitting an interference measurement report to the serving cell, wherein the interference measurement report indicates the estimated downlink-downlink interference.

14. The apparatus of claim 13, wherein the interference measurement is performed based on a radio resource management (RRM) measurement at a radio resource control (RRC) layer.

15. The apparatus of claim 14, wherein the interference measurement is performed based on a beam measurement at a physical layer (PHY).

16. The apparatus of claim 14, further comprising:
means for estimating at least a cross-uplink-downlink interference of the second UE in the neighbor cell.

17. An apparatus for wireless communication at a user equipment (UE), comprising:
a memory; and
at least one processor coupled to the memory and configured to:
transmit an indication of a downlink-downlink interference of a neighbor cell;
receive, based on transmitted indication, a configuration for a beam measurement report to measure the downlink-downlink interference based on a same reception beam as used for communication between the UE and a serving cell;
perform, based on the configuration, an interference measurement, comprising detecting a signal from the serving cell, the neighbor cell, or a second UE in the neighbor cell, the signal from the neighbor cell or the second UE interfering with communication between the UE and the serving cell;
estimate the downlink-downlink interference of the neighbor cell, wherein the UE estimates the downlink-downlink interference of the neighbor cell based on the same reception beam as used for communication between the UE and the serving cell; and
transmit an interference measurement report to the serving cell, wherein the interference measurement report indicates the estimated downlink-downlink interference.

18. The apparatus of claim 17, wherein the interference measurement is performed based on a radio resource management (RRM) measurement at a radio resource control (RRC) layer.

19. The apparatus of claim 17, wherein the interference measurement is performed based on a beam measurement at a physical layer (PHY).

20. The apparatus of claim 17, wherein the UE estimates the cross-uplink-downlink interference of an uplink signal from the second UE that interferes with a downlink communication to the UE from the serving cell, the at least one processor is further configured to:
receive a configuration from the serving cell to measure the uplink signal from the second UE.

21. A method of wireless communications for a network, the network comprising a central unit (CU) and one or more distributed units (DUs), the method comprising:
receiving an indication of a downlink-downlink interference of a neighbor cell from a User Equipment (UE);
configuring, based on the indication of the downlink-downlink interference of the neighbor cell, the UE for a beam measurement report to measure the downlink-downlink interference of the neighbor cell based on a same reception beam as used for communication between the UE and a serving cell, wherein the UE is configured to perform an interference measurement to detect a signal from the serving cell, the neighbor cell, or a second UE in the neighbor cell, the signal from the neighbor cell or the second UE interfering with communication between the UE and the serving cell; and
receiving an interference measurement report from the UE, the interference measurement report comprising an indication of an estimated downlink-downlink interference of the neighbor cell, wherein the downlink-downlink interference of the neighbor cell is estimated based on the same reception beam as used for communication between the UE and the serving cell.

22. The method of claim 21, wherein the signal comprises at least one of a serving cell downlink signal from the serving cell, a neighbor cell downlink signal from the neighbor cell to the second UE in the neighbor cell, and an uplink signal from the second UE to the neighbor cell.

23. The method of claim 21, wherein the interference measurement is performed based on a radio resource management (RRM) measurement at a radio resource control (RRC) layer.

24. The method of claim 21, wherein the interference measurement is performed based on a beam measurement at a physical layer (PHY).

25. The method of claim 21, wherein the indication of the downlink-downlink interference of the neighbor cell is received in a RRM measurement report from the UE.

26. The method of claim 21, wherein a channel state information-interference measurement (CSI-IM) resource in the beam measurement report is allocated to perform the interference measurement of the downlink-downlink interference.

27. The method of claim 21, wherein, when a refined beam is used for a downlink data transmission from the serving cell, a CSI-RS resource for a channel measurement is configured to be spatial Quasi co-located with the refined beam.

28. The method of claim 21, further comprising:
receiving, by the one or more DUs, the beam measurement report from the UE.

29. The method of claim 21, wherein at least part of the beam measurement report received from the UE is forwarded to the CU by the one or more DUs.

30. The method of claim 21, further comprising:
configuring the UE to detect a measurement quantity of the downlink-downlink interference based on the same reception beam.

31. The method of claim 30, further comprising:
transmitting a measurement quantity indication to the UE to enable or disable detection of the measurement quantity.

32. The method of claim 21, further comprising:
detecting an uplink reference signal from the second UE in the neighbor cell for estimating an uplink-uplink interference to communication from the UE to the serving cell.

33. The method of claim 32, wherein the uplink reference signal comprises a sounding reference signal (SRS) from the second UE.

34. The method of claim 32, further comprising:
estimating a measurement quantity of the uplink-uplink interference.

35. The method of claim 32, wherein the CU configures the DU to detect the uplink reference signal.

36. The method of claim 35, wherein the DU reports the uplink reference signal to the CU.

37. The method of claim 21, further comprising:
configuring the UE to measure an uplink reference signal for estimating cross-uplink-downlink interference to the communication from the serving cell to the UE.

38. The method of claim 37, wherein the uplink reference signal comprises a sounding reference signal (SRS) from the second UE.

39. The method of claim 37, wherein the interference measurement report indicates a measurement quantity of the cross-uplink-downlink interference.

40. The method of claim 21, further comprising:
detecting a downlink reference signal from the neighbor cell to the second UE for estimating a cross-downlink-uplink interference to the communication from the UE to the serving cell.

41. The method of claim 40, wherein the downlink reference signal comprises a SSB or CSI-RS from the second UE to the neighbor cell.

42. The method of claim 40, further comprising:
estimating a measurement quantity of the cross-downlink-uplink interference.

43. The method of claim 40, wherein the CU configures the DU to detect the downlink reference signal.

44. The method of claim 40, wherein the DU reports the downlink reference signal to the CU.

45. An apparatus for wireless communication, the apparatus comprising a central unit (CU) and one or more distributed units (DUs), the apparatus comprising:
means for receiving an indication of a downlink-downlink interference of a neighbor cell from a User Equipment (UE);
means for configuring, based on the indication of the downlink-downlink interference of the neighbor cell, the UE for a beam measurement report to measure the downlink-downlink interference of the neighbor cell based on a same reception beam as used for communication between the UE and a serving cell, wherein the UE is configured to perform an interference measurement to detect a signal from the serving cell, the neighbor cell, or a second UE in the neighbor cell, the signal from the neighbor cell or the second UE interfering with communication between the UE and the serving cell; and
means for receiving an interference measurement report from the UE, the interference measurement report comprising an indication of an estimated downlink-downlink interference of the neighbor cell, wherein the downlink-downlink interference of the neighbor cell estimated is based on the same reception beam as used for communication between the UE and the serving cell.

46. The apparatus of claim 45, wherein the interference measurement is performed based on a radio resource management (RRM) measurement at a radio resource control (RRC) layer.

47. The apparatus of claim 45, wherein the interference measurement is performed based on a beam measurement at a physical layer (PHY).

48. The apparatus of claim 45, further comprising:
means for detecting an uplink reference signal from the second UE in the neighbor cell for estimating an uplink-uplink interference to communication from the UE to the serving cell.

49. The apparatus of claim 45, further comprising:
means for detecting a downlink reference signal from the neighbor cell to the second UE for estimating a cross-downlink-uplink interference to the communication from the UE to the serving cell.

50. An apparatus for wireless communication, comprising:
a memory; and
at least one processor coupled to the memory and configured to:
receive an indication of a downlink-downlink interference of a neighbor cell from a User Equipment (UE);
configure, based on the indication of the downlink-downlink interference of the neighbor cell, the UE for a beam measurement report to measure the downlink-downlink interference of the neighbor cell based on a same reception beam as used for communication between the UE and a serving cell, wherein the UE is configured to perform an interference measurement to detect a signal from the serving cell, the neighbor cell, or a second UE in the neighbor cell, the signal from the neighbor cell or the second UE interfering with communication between the UE and the serving cell; and
receive an interference measurement report from the UE, the interference measurement report comprising an indication of an estimated downlink-downlink interference of the neighbor cell, wherein the downlink-downlink interference of the neighbor cell is estimated based on the same reception beam as used for communication between the UE and the serving cell.

51. The apparatus of claim 50, wherein the interference measurement is performed based on a radio resource management (RRM) measurement at a radio resource control (RRC) layer.

52. The apparatus of claim 50, wherein the interference measurement is performed based on a beam measurement at a physical layer (PHY).

53. The apparatus of claim 50, wherein the at least one processor is further configured to:

detect an uplink reference signal from the second UE in the neighbor cell for estimating an uplink-uplink interference to communication from the UE to the serving cell.

54. The apparatus of claim 50, wherein the at least one processor is further configured to:
detect a downlink reference signal from the neighbor cell to the second UE for estimating a cross-downlink-uplink interference to the communication from the UE to the serving cell.

* * * * *